(12) United States Patent
Morikawa

(10) Patent No.: US 7,369,285 B2
(45) Date of Patent: May 6, 2008

(54) METHOD OF PROCESSING IMAGE

(75) Inventor: Seiichiro Morikawa, Hiratsuka (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 11/375,252

(22) Filed: Mar. 15, 2006

(65) Prior Publication Data

US 2006/0158705 A1 Jul. 20, 2006

Related U.S. Application Data

(63) Continuation of application No. 09/814,790, filed on Mar. 23, 2001, which is a continuation-in-part of application No. 09/768,511, filed on Jan. 25, 2001, now abandoned.

(30) Foreign Application Priority Data

Jan. 26, 2000 (JP) .............................. 2000-017554

(51) Int. Cl.
*G03F 3/08* (2006.01)
*G06F 15/00* (2006.01)
*G06K 9/00* (2006.01)

(52) U.S. Cl. ...................... 358/521; 358/1.9; 382/167

(58) Field of Classification Search ................ 358/1.9, 358/521, 520, 518, 538, 540, 529; 382/167, 382/162
See application file for complete search history.

(56) References Cited

U.S. PATENT DOCUMENTS

| | | | | |
|---|---|---|---|---|
| 4,847,654 A | * | 7/1989 | Honma et al. ............... | 358/300 |
| 4,849,809 A | * | 7/1989 | Tahara et al. ............... | 358/540 |
| 4,931,863 A | * | 6/1990 | Tokuda ........................ | 358/540 |
| 4,965,662 A | * | 10/1990 | Shiota ......................... | 358/540 |
| 4,978,226 A | * | 12/1990 | Moriya et al. .............. | 358/538 |
| 5,541,740 A | | 7/1996 | Mori | |
| 5,576,847 A | * | 11/1996 | Sekine et al. ............... | 358/448 |
| 5,696,889 A | * | 12/1997 | Morikawa ................... | 358/1.9 |
| 5,703,694 A | * | 12/1997 | Ikeda et al. ................. | 358/296 |
| 5,798,842 A | * | 8/1998 | Yamazaki ................... | 358/302 |
| 5,940,192 A | * | 8/1999 | Ichikawa et al. ........... | 358/530 |
| 5,940,530 A | * | 8/1999 | Fukushima et al. ......... | 382/164 |
| 5,950,043 A | | 9/1999 | Fujita et al. | |
| 5,999,646 A | * | 12/1999 | Tamagaki ................... | 382/169 |
| 6,002,806 A | * | 12/1999 | Morikawa ................... | 382/274 |
| 6,167,167 A | * | 12/2000 | Matsugu et al. ............ | 382/283 |
| 6,282,314 B1 | * | 8/2001 | Sugiura et al. ............. | 382/173 |

(Continued)

FOREIGN PATENT DOCUMENTS

JP       362200355       9/1987

(Continued)

OTHER PUBLICATIONS

Japanese Office Action dated Sep. 4, 2007.

*Primary Examiner*—Madeleine AV Nguyen
(74) *Attorney, Agent, or Firm*—Sughrue Mion, PLLC

(57) ABSTRACT

An attentional portion to be corrected in gradation of an image is specified, and a gradation corrective function with respect to a density of the specified attentional portion is generated. Preset gradation conversion characteristics are corrected with the gradation corrective function, and the gradation of the image is converted according to the corrected gradation conversion characteristics. The gradation conversion characteristics can be corrected in the vicinity of a desired density.

9 Claims, 23 Drawing Sheets

U.S. PATENT DOCUMENTS

| | | | |
|---|---|---|---|
| 6,424,752 B1 * | 7/2002 | Katayama et al. | 382/284 |
| 6,473,198 B1 * | 10/2002 | Matama | 358/1.9 |
| 6,600,832 B1 * | 7/2003 | Nakayama et al. | 382/162 |
| 2004/0130738 A1 * | 7/2004 | Yagishita et al. | 358/1.9 |
| 2005/0036173 A1 * | 2/2005 | Hayashi et al. | 358/2.1 |

FOREIGN PATENT DOCUMENTS

| | | |
|---|---|---|
| JP | 02-092159 | 3/1990 |
| JP | 404111180 | 4/1992 |
| JP | 06-178115 | 6/1994 |
| JP | 06-292010 | 10/1994 |
| JP | 09-083824 | 3/1997 |
| JP | 10233924 | 9/1998 |
| JP | 410285402 | 10/1998 |
| JP | 10-322551 | 12/1998 |
| JP | 11-266358 | 9/1999 |
| JP | 2000-011145 | 1/2000 |

* cited by examiner

METHOD OF PROCESSING IMAGE

This is a continuation of application Ser. No. 09/814,790 filed Mar. 23, 2001 which is a Continuation-in-Part of application Ser. No. 09/768,511 filed Jan. 25, 2001 now abandoned. The entire disclosure of the prior application Ser. No. 09/814,790, which is a Continuation-in-Part of application Ser. No. 09/768,511, is considered part of the disclosure of the accompanying divisional application and is hereby incorporated by reference.

BACKGROUND OF THE INVENTION

1. Field of the Invention

The present invention relates to a method of processing an image by way of gradation conversion or color correction.

2. Description of the Related Art

In the printing and platemaking fields, there have widely been used image reading, recording, and reproducing systems for electrically processing a color image recorded on a subject to be read, producing film plates or printing plates in the colors C, M, Y, K, and obtaining a desired print from the film plates or printing plates for the purposes of making printing and platemaking processes more efficient and improving the image quality.

The color image is read by a scanner device or the like and then converted in gradation or corrected in color for each of the colors C, M, Y, K in order to obtain a print in a desired gradation or color tone with respect to an attentional portion.

Specifically, the gradation converting process converts the density of the color image into a density capable of achieving a desired output halftone dot %. A tone curve, which is an input-density vs. output-density conversion table, used in the gradation converting process is adjusted in highlight (HL), shadow (SD), and middle (MD) portions of the color image according to a gradation corrective coefficient that the operator has established. However, the tone curve is adjusted by correcting gradation corrective functions prepared respectively for the HL, SD, and MD portions based on the gradation corrective coefficient. Consequently, if a certain gradation between the HL and MD portions is finely adjusted, then the gradation of an unintended portion is also varied.

In the color correcting process, it is customary to prepare corrective intensity functions primarily for the six hues of C, M, Y, R, G, B and correct the corrective intensity functions using a color corrective coefficient established by the operator for thereby obtaining a desired color tone. For adjusting the color tone of a particular portion, since the corrective intensity functions are set primarily for the six hues of C, M, Y, R, G, B, the color tone of an unintended portion is also varied. For example, if a flesh color is to be adjusted, then since the corrective intensity functions primarily for the hues of R and Y are corrected, the hues of R and Y are largely changed rather than the flesh color itself. If a duller green is to be adjusted, then since a corrective intensity function is corrected more greatly for a color of greater saturation, a more vivid green is changed rather than the duller green.

SUMMARY OF THE INVENTION

It is a general object of the present invention to provide a method of processing an image by adjusting the gradation mainly of an attentional portion thereof while preventing the gradation of other unintended portions from being affected by the adjustment.

A major object of the present invention is to provide a method of processing an image so as to be able to adjust the density mainly of an attentional portion thereof.

Another object of the present invention is to provide a method of processing an image so as to be able to arbitrarily setting a density range to be adjusted of the color image.

A general object of the present invention is to provide a method of processing a color image by adjusting a color of mainly a portion attentional thereof while preventing a color of other unintended portions from being affected by the adjustment.

A primary object of the present invention is to provide a method of processing a color image so as to be able to adjust a hue mainly of a portion attentional thereof.

Still another object of the present invention is to provide a method of processing a color image so as to be able to adjust a lightness mainly of an attentional portion thereof.

Yet another object of the present invention is to provide a method of processing a color image so as to be able to adjust a saturation mainly of an attentional portion thereof.

Yet still another object of the present invention is to provide a method of processing a color image so as to be able to adjust independently a hue, a lightness, and a saturation mainly of a portion attentional thereof.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
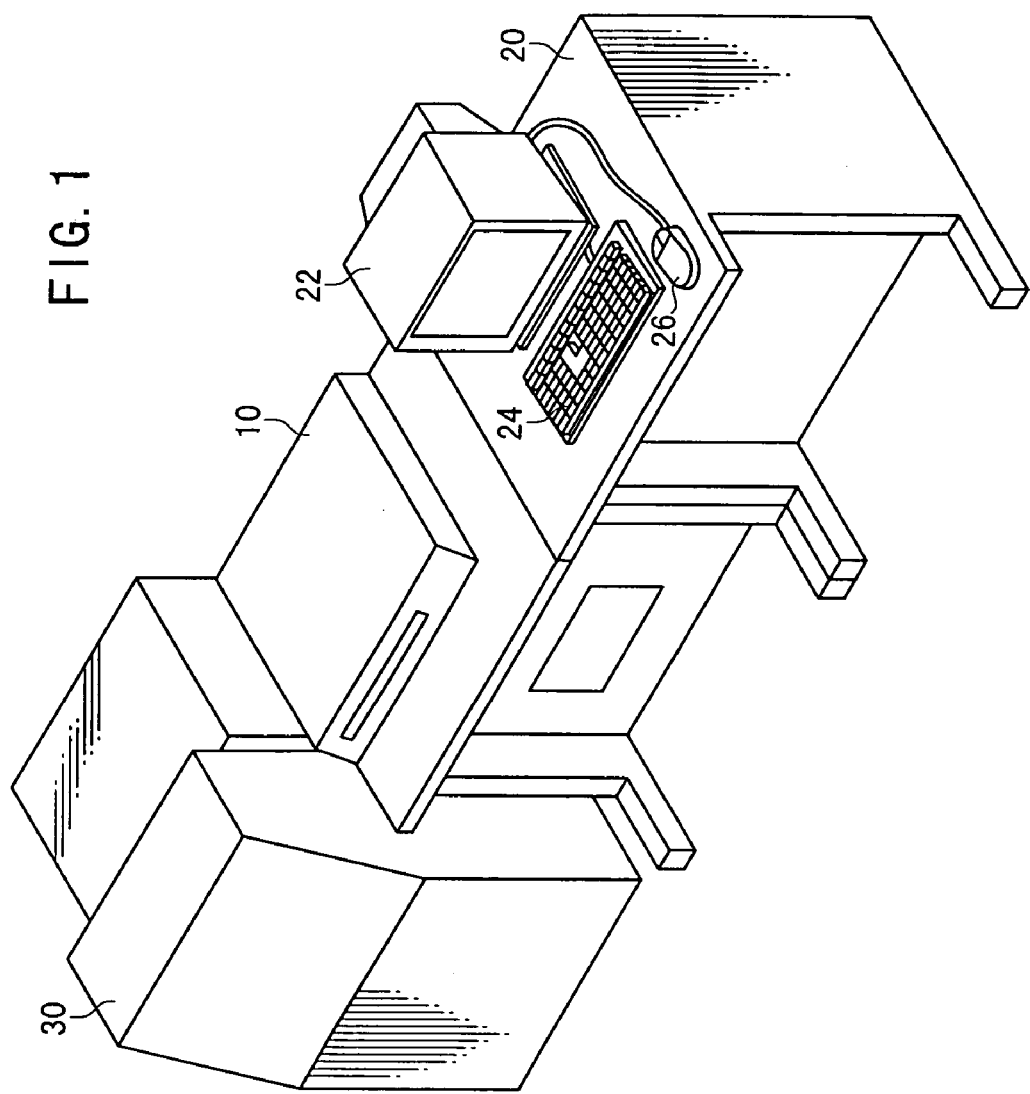
FIG. 1 is a perspective view of an image reading, recording, and reproducing system for carrying out a method of processing a color image according to the present invention.

FIG. 1 shows in perspective an image reading, recording, and reproducing system for carrying out a method of processing a color image according to the present invention. As shown in FIG. 1, the image reading, recording, and reproducing system basically comprises an input scanner 10 for reading a color image recorded on a subject, an image processing device 20 for processing the read color image for gradation conversion, color correction, etc., and an output device 30 for outputting the processed color image as film plates in the four colors of C, M, Y, K. The output device 30 may comprise a device for directly outputting printing plates.

The image processing device 20 has a display unit 22 for displaying the color image read by the input scanner 10 and also displaying various setup parameters for image processing and processed results, and a keyboard 24 and a mouse 26 which are operable by the operator for entering setup parameters and changing displayed views.

Figure 2:
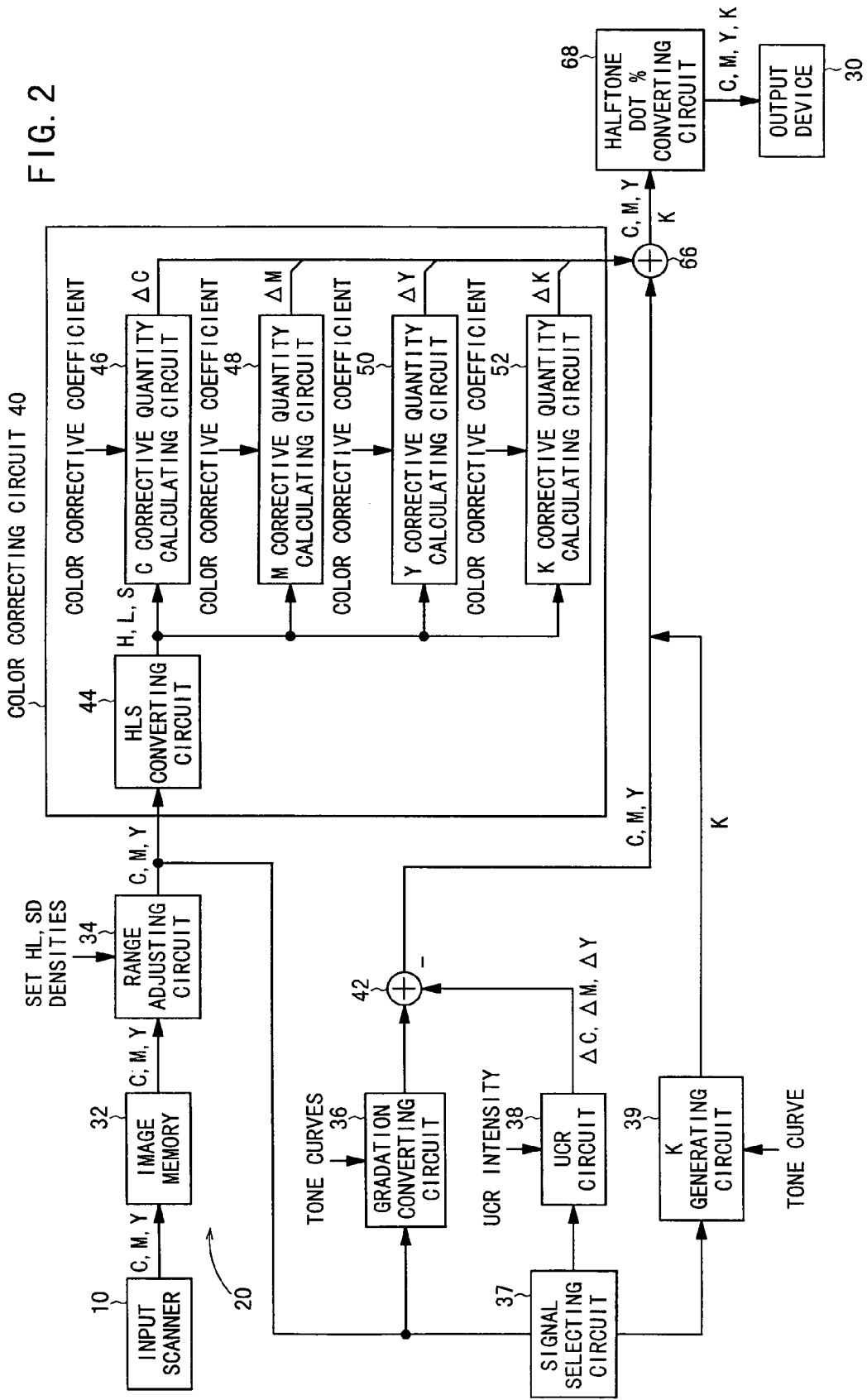
FIG. 2 is a block diagram of an image processing circuit primarily of an image processing device of the image reading, recording, and reproducing system.

FIG. 2 shows in block form an image processing circuit primarily of the image processing device 20 shown in FIG. 1. As shown in FIG. 2, the image processing device 20 has an image memory 32 for storing three-color density data C, M, Y that have been produced by the input scanner 10 from the color separation of the color image read thereby.

Figure 3:
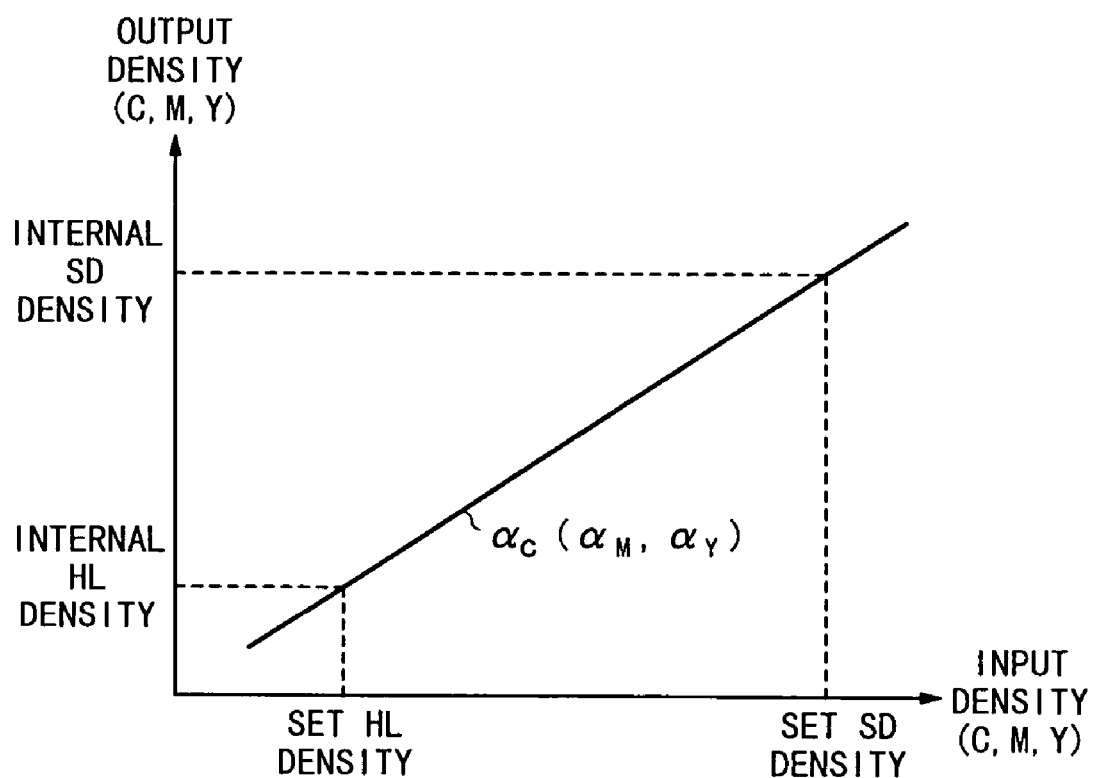
FIG. 3 is a diagram showing conversion characteristics of a range adjusting circuit for conversion between set densities and internal densities.
Figure 4:
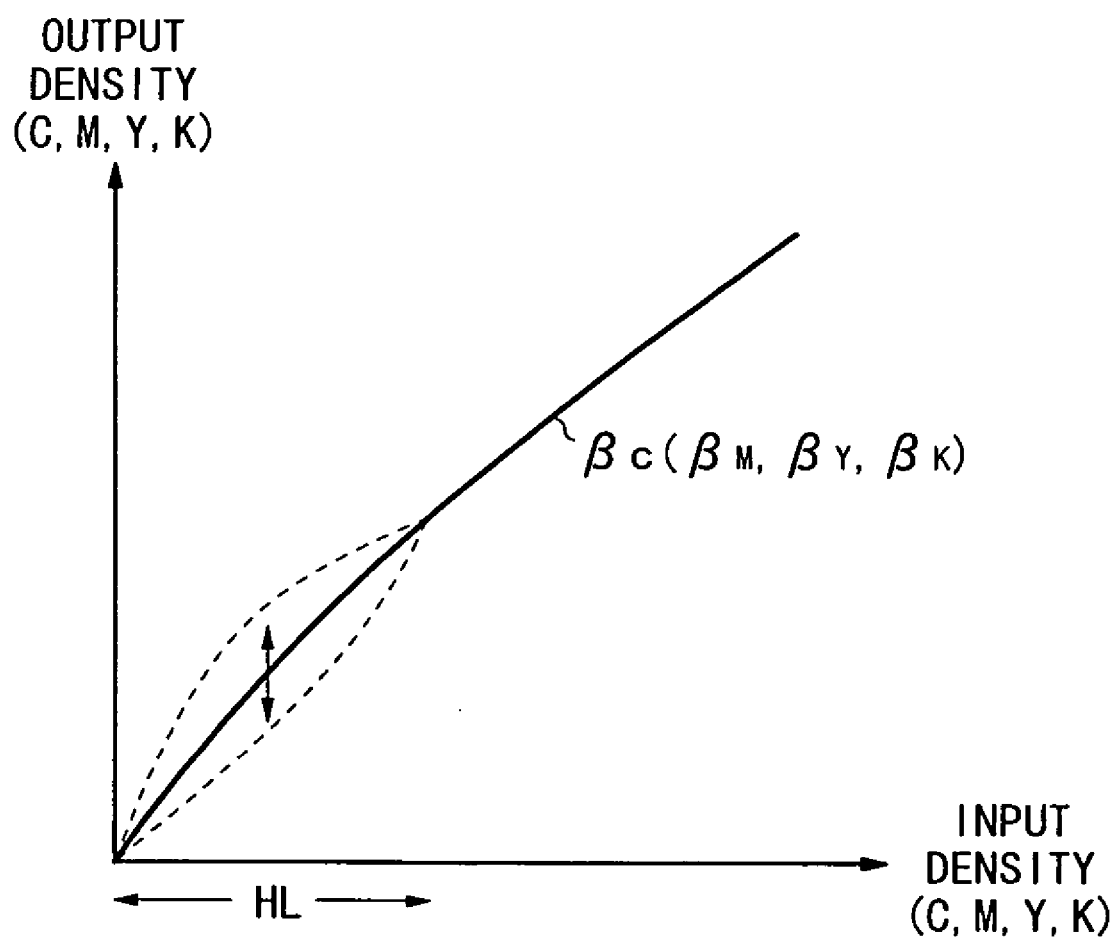
FIG. 4 is a diagram illustrating the adjustment of gradation conversion characteristics of a gradation converting circuit in a highlight density range.
Figure 5:
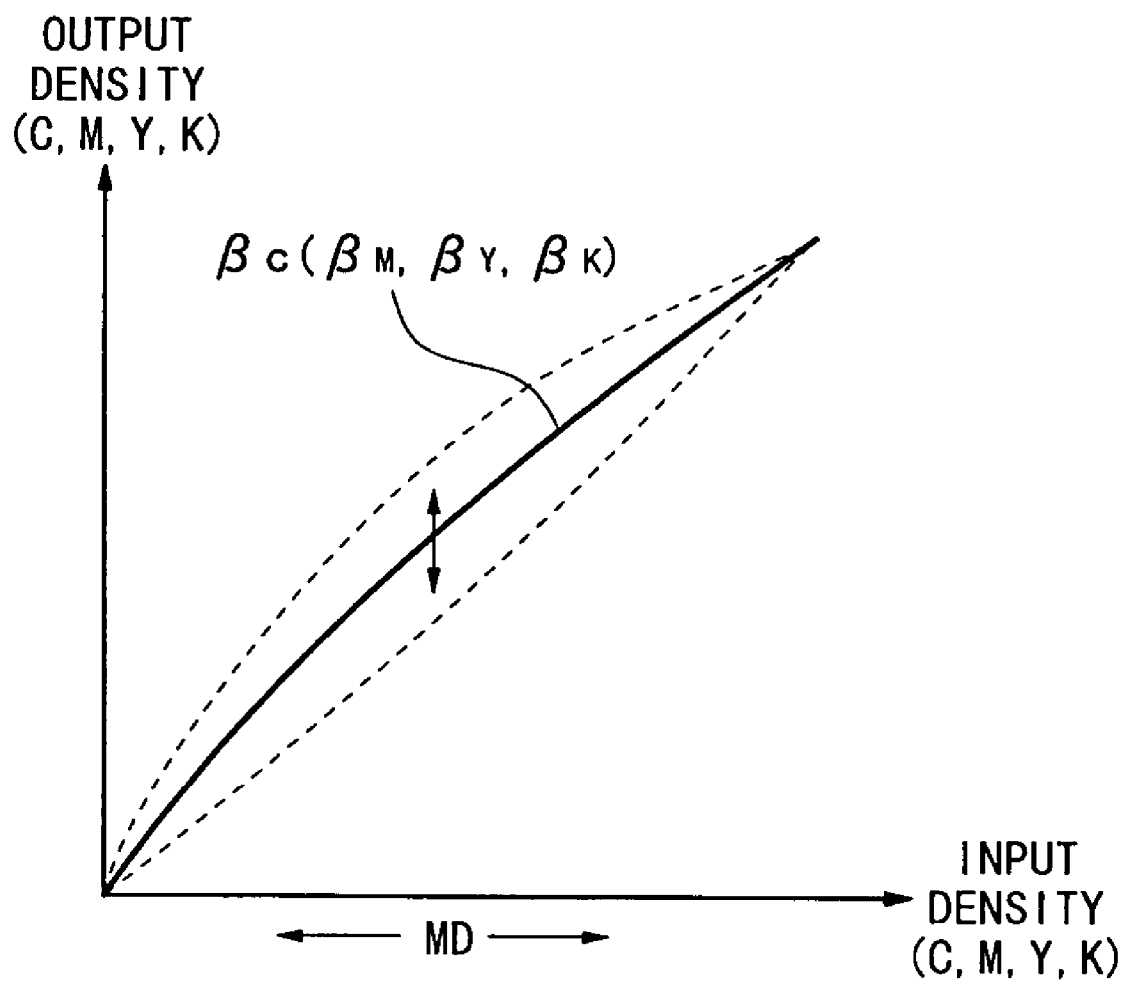
FIG. 5 is a diagram illustrating the adjustment of gradation conversion characteristics of the gradation converting circuit in a medium density range.
Figure 6:
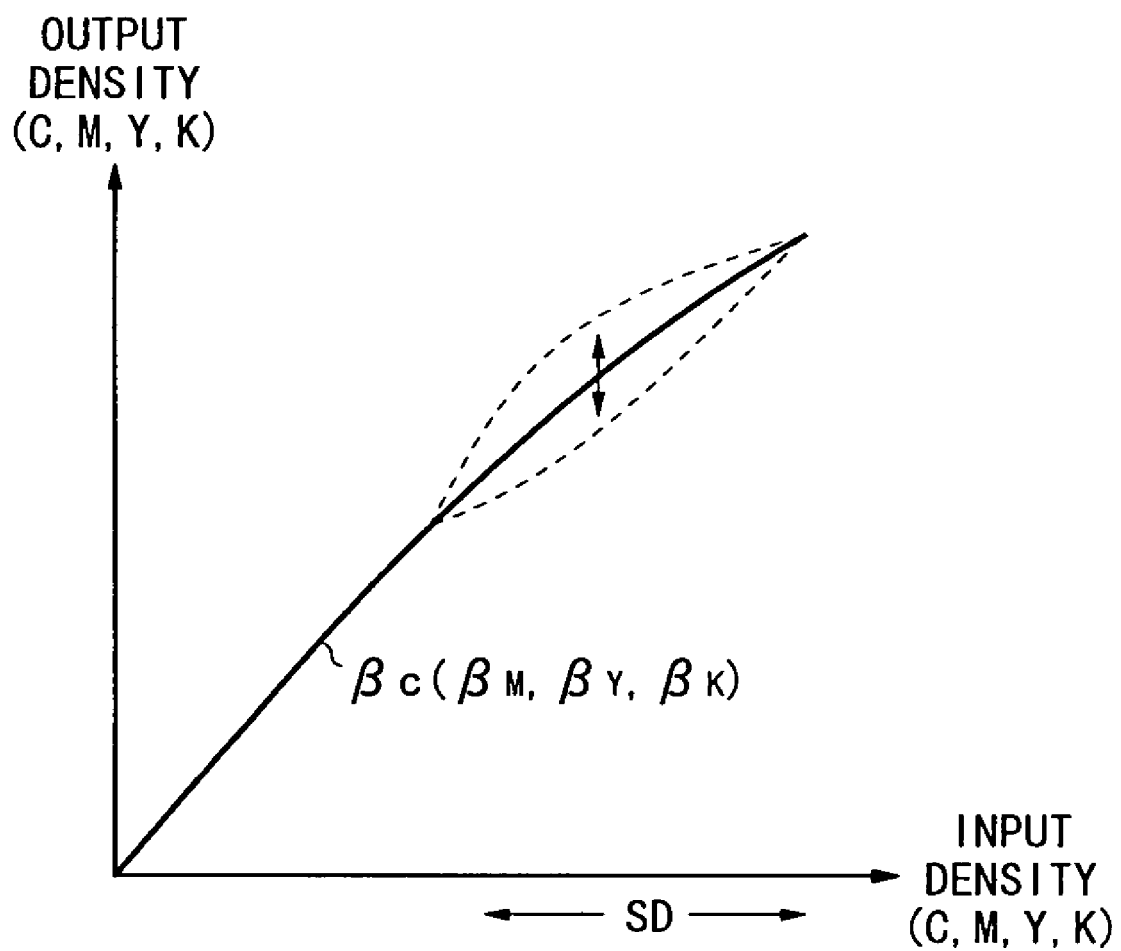
FIG. 6 is a diagram illustrating the adjustment of gradation conversion characteristics of the gradation converting circuit in a shadow density range.
Figure 7:
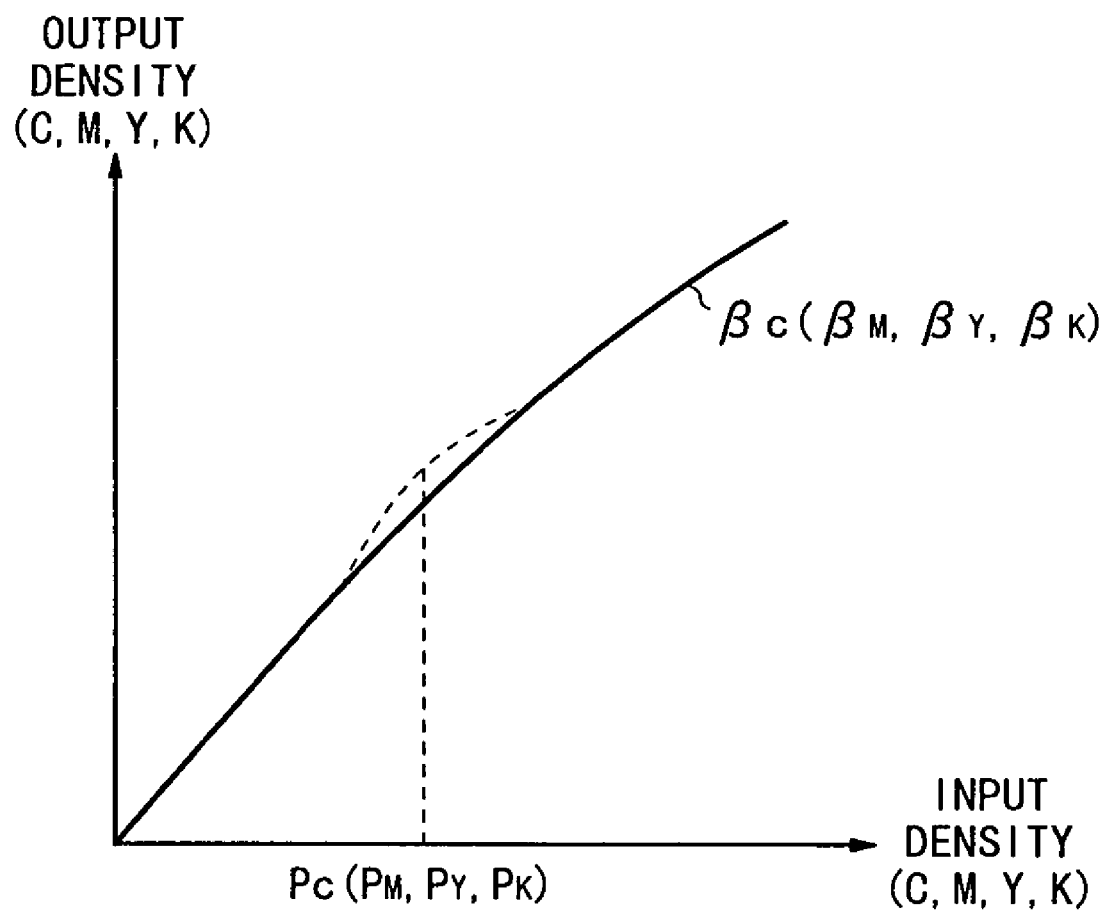
FIG. 7 is a diagram illustrating the adjustment of gradation conversion characteristics of the gradation converting circuit in the vicinity of the density of an attentional portion.

The image processing device 20 also has a range adjusting circuit 34 connected to the output terminal of the image memory 32. As shown in FIG. 3, the range adjusting circuit 34 generates primary conversion tables $\alpha_C$, $\alpha_M$, $\alpha_Y$, associated with the respective density data C, M, Y, for converting a set HL density and a set SD density that have been set by the operator for respective highlight and shadow portions of the color image into respective preset reference internal HL and SD densities of the image processing device 20, and adjusts the ranges of the respective density data C, M, Y based on the primary conversion tables $\alpha_C$, $\alpha_M$, $\alpha_Y$.

The image processing device 20 further includes a gradation converting circuit 36, a signal selecting circuit 37, and a color correcting circuit 40 that are connected to the output terminal of the range adjusting circuit 34.

The gradation converting circuit 36 converts the gradations of the respective density data C, M, Y supplied from the range adjusting circuit 34 according to tone curves corresponding to preset gradation conversion characteristics in order to obtain desired halftone dot % data C, M, Y. Specifically, the gradation converting circuit 36 corrects existing gradation corrective functions in the respective densities of the HL, MD, SD portions based on a gradation corrective coefficient set by the operator, generates new gradation corrective functions with respect to an attentional portion that the operator has indicated, corrects the new gradation corrective functions according to the gradation corrective coefficient set by the operator, adjusts tone curves $\beta_C$, $\beta_M$, $\beta_Y$ (see dotted-line curves in FIGS. 4 through 7) for the respective density data C, M, Y using the corrected gradation corrective functions, and converts the gradations of the respective density data C, M, Y using the adjusted tone curves $\beta_C$, $\beta_M$, $\beta_Y$. The converted density data C, M, Y are supplied to an adder 42. Details of the above conversion of the gradations of the respective density data C, M, Y will be described later on.

The signal selecting circuit 37 selects maximum and minimum values from the density data C, M, Y, and supplies the selected maximum and minimum values to an UCR (Under Color Removal) circuit 38 and a K generating circuit 39.

The UCR circuit 38 effects a UCR process on the density data C, M, Y supplied from the range adjusting circuit 34, calculates corrective Quantities $\Delta C$, $\Delta M$, $\Delta Y$ for the density data C, M, Y, and supplies the calculated corrective quantities $\Delta C$, $\Delta M$, $\Delta Y$ as negative data to the adder 42, which adds the corrective quantities $\Delta C$, $\Delta M$, $\Delta Y$ to the converted density data C, M, Y. The quantities $\Delta C$, $\Delta M$, $\Delta Y$ may be determined from the maximum and minimum values of the density data C, M, Y selected by the signal selecting circuit 37 and a UCR intensity set by the operator.

The K generating circuit 39 generates density data K according to a tone curve $\beta_K$ (see dotted-line curves in FIGS. 4 through 7) adjusted in the same manner as with the density data C, M, Y in the gradation converting circuit 36, based on the minimum values of the density data C, M, Y selected by the signal selecting circuit 37.

The color correcting circuit 40 performs a process of turning a color tone according to the density data C, M, Y supplied from the range adjusting circuit 34 into a desired color tone. As shown in FIG. 2, the color correcting circuit 40 comprises an HLS converting circuit 44 for converting the density data C, M, Y into a hue H, a lightness L, and a saturation S, and a C corrective quantity calculating circuit 46, an M corrective quantity calculating circuit 48, a Y corrective quantity calculating circuit 50, and a K corrective quantity calculating circuit 52 for calculating respective corrective quantities $\Delta C$, $\Delta M$, $\Delta Y$, $\Delta K$ for the respective density data C, M, Y, K from the hue H, the lightness L, and the saturation S, using color corrective coefficients set by the operator.

Figure 8:
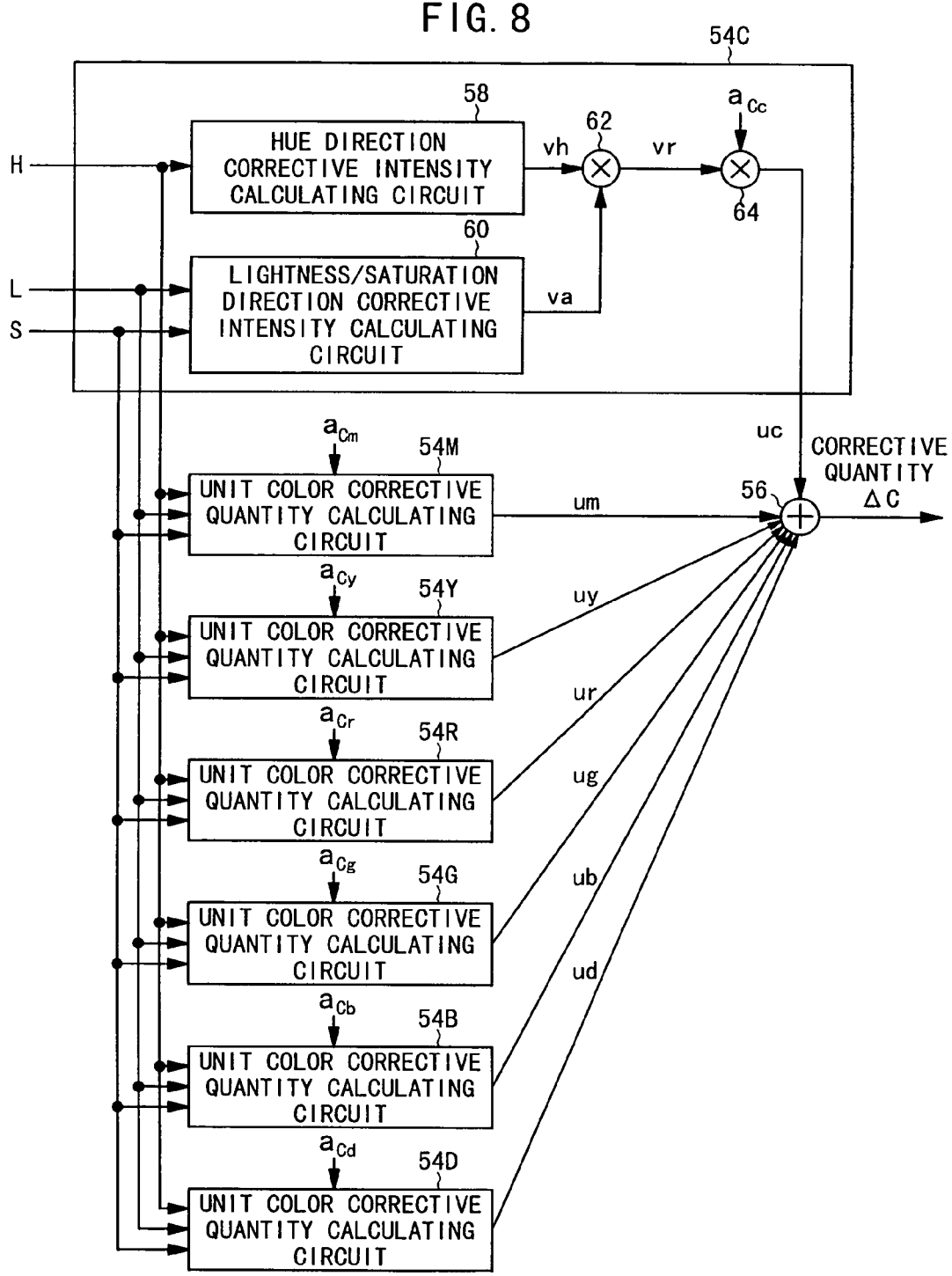
FIG. 8 is a block diagram of a C corrective quantity calculating circuit in a color correcting circuit of the image reading, recording, and reproducing system.

As shown in FIG. 8, the C corrective quantity calculating circuit 46 has unit color corrective quantity calculating circuits 54C, 54M, 54Y, 54R, 54G, 54B, 54D for determining respective unit color corrective quantities uc, um, uy, ur, ug, ub, ud with respect to unit hues corresponding to C, M, Y, R, G, B and a unit hue D specified by the attentional portion indicated by the operator, from the hue H, the lightness L, and the saturation S supplied from the HLS converting circuit 44. The determined unit color corrective quantities uc, um, uy, ur, ug, ub, ud are added into the corrective quantity ΔC by the adder 56.

The unit color corrective quantity calculating circuit 54C comprises a hue direction corrective intensity calculating circuit 58 for calculating a corrective intensity vh from the hue H using a hue direction corrective intensity function with respect to the hue corresponding to C, a lightness/saturation direction corrective intensity calculating circuit 60 for calculating a corrective intensity va from the lightness L and the saturation S using a lightness/saturation direction corrective intensity function with respect to the hue corresponding to C, a multiplier 62 for multiplying the correction intensities vh, va to produce a corrective intensity vr as the product, and a multiplier 64 for multiplying the corrective intensity vr by the color corrective coefficient set by the operator thereby calculating a unit color corrective quantity uc for the density data C with respect to the hue corresponding to C. The calculated unit color corrective quantity uc is supplied to an adder 56, which adds the unit color corrective quantity uc and the other unit color corrective quantities um, uy, ur, ug, ub, ud into the corrective quantity ΔC for the density data C.

Figure 9:
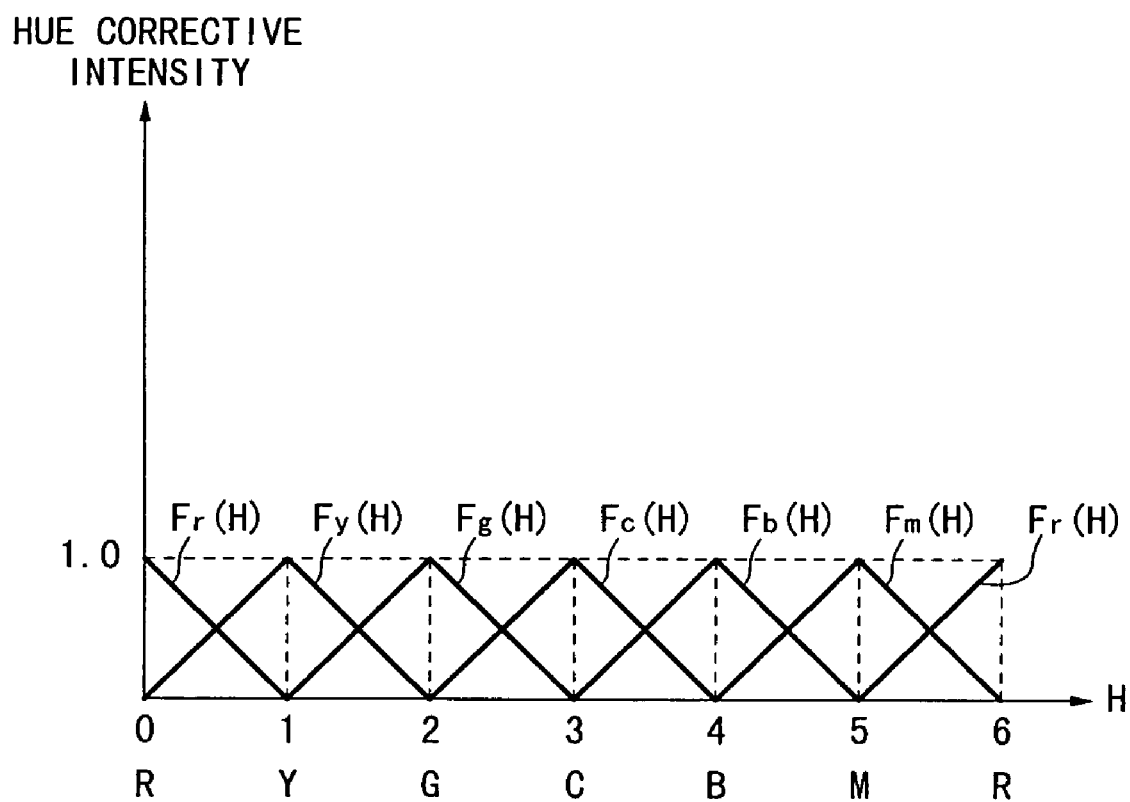
FIG. 9 is a diagram illustrating a hue direction corrective intensity function.
Figure 10:
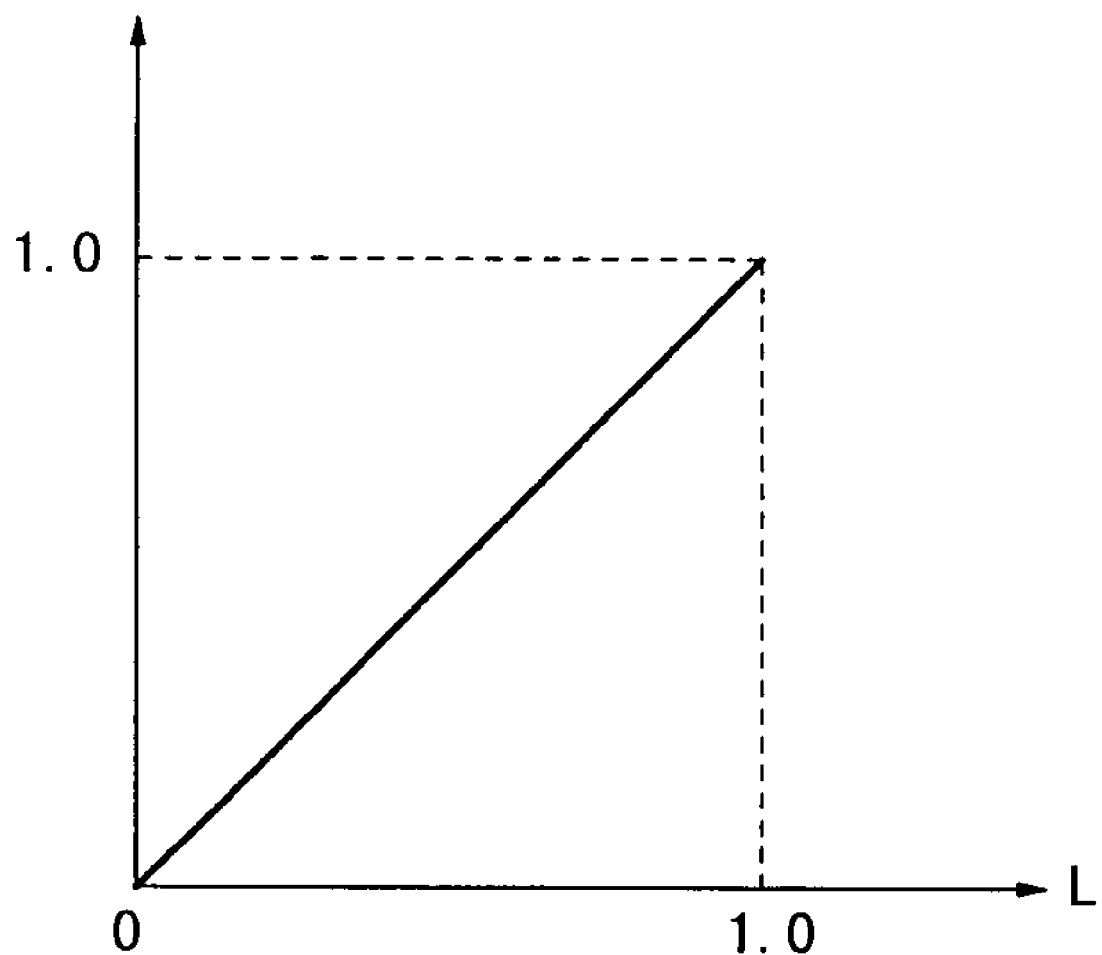
FIG. 10 is a diagram illustrating a lightness corrective intensity function.
Figure 11:
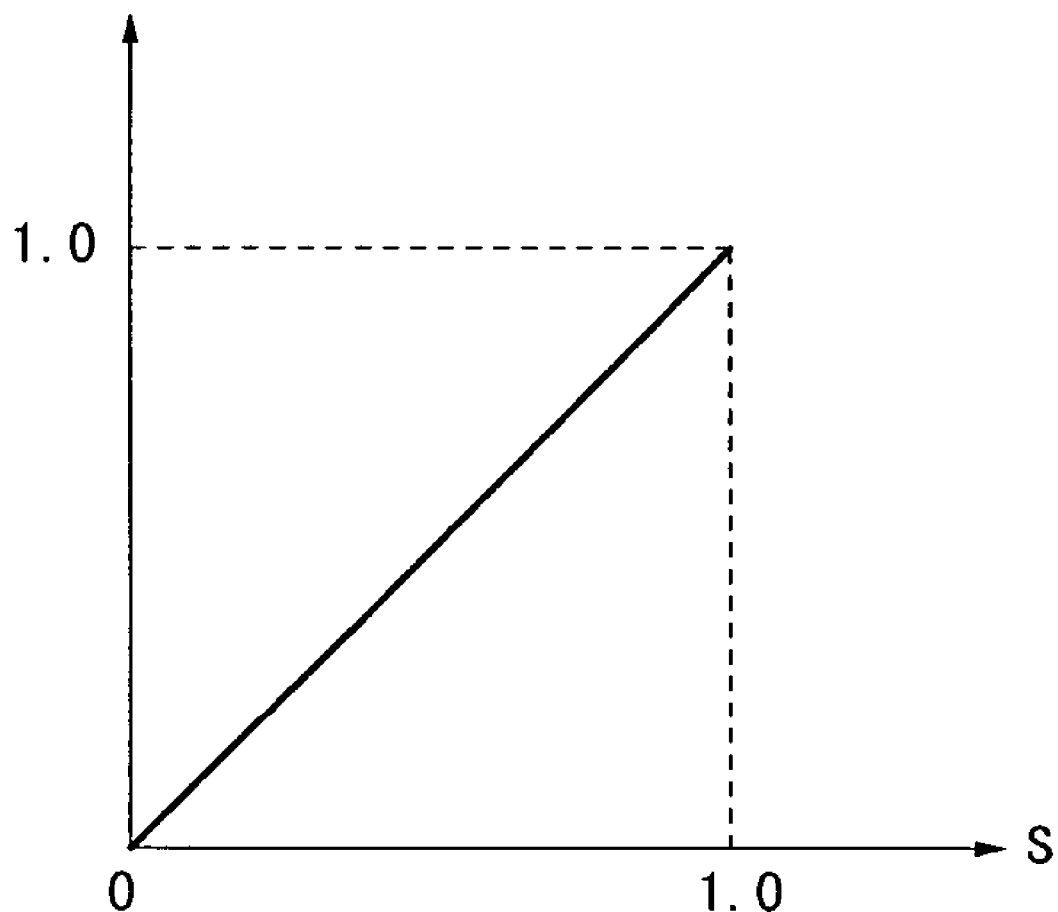
FIG. 11 is a diagram illustrating a saturation corrective intensity function.

As shown in FIG. 9, an existing hue direction corrective intensity function is established such that its corrective intensity has peaks at the respective centers of the six hues corresponding to C, M, Y, R, G, B and symmetrically progressively decreases from the peaks to "0" at the centers of adjacent hues. As shown in FIGS. 10 and 11, an existing lightness/saturation direction corrective intensity function is established as the product of straight lines passing through points (0, 0) and (1, 1) which represent a corrective intensity function for the lightness L and a corrective intensity function for the saturation S, respectively.

The unit color corrective quantity calculating circuit 54D generates a new hue direction corrective intensity function and a new lightness/saturation direction corrective intensity function with respect to the attentional portion indicated by the operator, and calculates the unit color corrective quantity ud using the new direction corrective intensity functions and the color corrective coefficient set by the operator.

The M corrective quantity calculating circuit 48, the Y corrective quantity calculating circuit 50, and the K corrective quantity calculating circuit 52 are identical to the C corrective quantity calculating circuit 46 and hence will not be described in detail below. The unit color corrective quantity calculating circuits 54M, 54Y, 54R, 54G, 54B, 54D are identical to the unit color corrective quantity calculating circuit 54C and hence will not be described in detail below. Details of the above color correcting process carried out by the color correcting circuit 40 will be described later on.

The corrective quantities ΔC, ΔM, ΔY, ΔK for the respective density data C, M, Y, K which are determined by the color correcting circuit 40 are added to the gradation-converted density data C, M, Y, K by an adder 66, which supplies density data C, M, Y, K adjusted in gradation and color tone to a halftone dot % converting circuit 68. The halftone dot % converting circuit 68 converts each of the density data C, M, Y, K into halftone dot % data depending on the output characteristics of the output device 30, and outputs the converted halftone dot % data to the output device 30.

Operation of the image reading, recording, and reproducing system thus constructed will be described below primarily with respect to the gradation converting process and the color correcting process according to the present invention.

A color image recorded on a subject is read by the input scanner 10, and stored as density data C, M, Y into the image memory 32. The read color image is displayed on the display unit 22. The operator establishes a set HL density and a set SD density with respect to the displayed color image. The image processing device 20 generates primary conversion tables $\alpha_C$, $\alpha_M$, $\alpha_Y$ (see FIG. 3) for converting the set HL density and the set SD density into respective preset reference internal HL and SD densities, and sets the generated primary conversion tables $\alpha_C$, $\alpha_M$, $\alpha_Y$ in the range adjusting circuit 34.

The range adjusting circuit 34 reads the density data C, M, Y from the image memory 32, and adjusts the ranges of the respective density data C, M, Y based on the primary conversion tables $\alpha_C$, $\alpha_M$, $\alpha_Y$ based on the internal HL and SD densities.

The range-adjusted density data C, M, Y are supplied to the gradation converting circuit 36, the signal selecting circuit 37, and the color correcting circuit 40.

Figure 12:
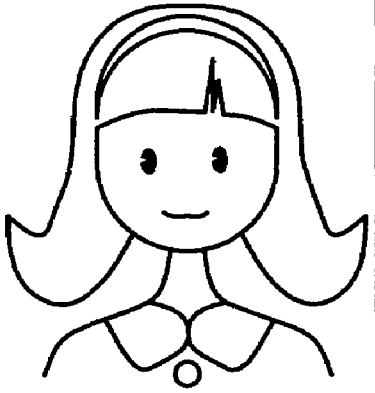
FIG. 12 is a view showing a displayed tone curve setting view.

The display unit 22 displays a tone curve setting view as well as the read color image, as shown in FIG. 12. The operator adjusts tone curves according to the displayed tone curve setting view, as follows:

First, the operator selects existing tone curves $\beta_C$, $\beta_M$, $\beta_Y$, $\beta_K$ preset with respect to the density data C, M, Y, K, respectively. Each of the tone curves $\beta_C$, $\beta_M$, $\beta_Y$, $\beta_K$ may be preset in a plurality of sets depending on the type of the color image and the preference of the operator.

Then, the operator sets gradation corrective coefficients $g_{Xw}$ for correcting the gradations of highlight (HL), shadow (SD), and middle (MD) portions of the selected tone curves $\beta_C$, $\beta_M$, $\beta_Y$, $\beta_K$ and the gradation of any desired attentional portion. The suffix X of $g_{Xw}$ represents X=C, M, Y, K and the suffix w thereof represents w=h, m, s, d, indicating the gradation corrective coefficients for the highlight (HL), shadow (SD), and middle (MD) portions of the density data C, M, Y, K and the attentional portion (Def). The gradation corrective coefficients $g_{Xw}$ may be called as existing coefficients from a memory (not shown) or the like, rather than being set by the operator.

A process of adjusting a selected tone curve $\beta_X$ will be described below by way of example. The selected tone curve $\beta_X$ to be adjusted is turned 45° clockwise in FIG. 13 about the origin in the highlight portion, and then compressed by $1/\sqrt{2}$ in both the directions of input and output densities, thus generating a new tone curve $\beta_X'$. Then, as shown in FIG. 14, gradation corrective functions $\gamma_h$, $\gamma_m$, $\gamma_s$, $\gamma_d$ set with respect to the highlight (HL), shadow (SD), and middle (MD) portions and the attentional portion (Def) are added to the new tone curve $\beta_X'$, thus determining a tone curve $\beta_X''$ according to the following equation (1):

$$\beta_X'' = \beta_X' + g_{Xh} \cdot \gamma_h + g_{Xm} \cdot \gamma_m + g_{Xs} \cdot \gamma_s + g_{Xd} \cdot \gamma_d \quad (1)$$

Figure 15:
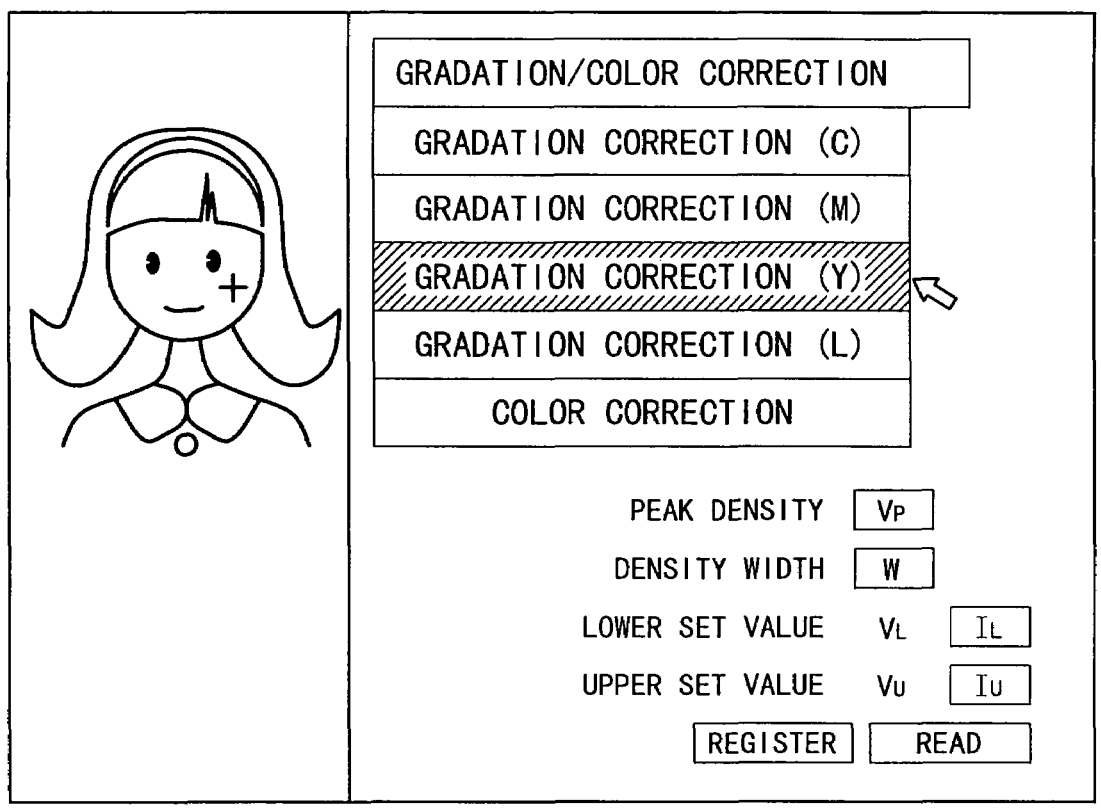
FIG. 15 is a view showing a displayed view for setting a gradation corrective function with respect to the density of an attentional portion.

The gradation corrective fuiction $\gamma_d$ with respect to the attentional portion (Def) can be set as follows:

When the operator selects the button "CHANGE" in the tone curve setting view shown in FIG. 12, the display unit 22 displays a view for setting a gradation corrective function shown in FIG. 15. In the displayed view, the operator uses the mouse 26 to specify an attentional portion, i.e., a spot where "+" is displayed on the image. At this time, the operator may specify a plurality of spots as the attentional portion. Alternatively, the operator may specify an area surrounded by a line. Then, the operator selects the button "GRADATION/COLOR CORRECTION", whereupon the display unit 22 displays a menu including "GRADATION CORRECTION (C)", "GRADATION CORRECTION (M)", "GRADATION CORRECTION (Y)", "GRADATION CORRECTION (L)", and "COLOR CORRECTION".

It is assumed that the operator selects the item "GRADATION CORRECTION (Y)". The item "GRADATION CORRECTION (Y)" serves to determine a gradation corrective function $\gamma_d$. The operator specifies an attentional portion with the mouse 26, and sets a desired density width W and intensities $I_L$, $I_U$ of lower and upper set values $V_L$, $V_U$ of the gradation corrective function $\gamma_d$.

If the value $P_Y$ of the density data Y of the attentional portion specified by the operator is used as a peak density $V_P$, then the image processing device 20 determines the lower and upper set values $V_L$, $V_U$ of the gradation corrective function $\gamma_d$ as follows:

$$V_L = (1-W) \cdot V_P \quad (2)$$

$$V_U = W + (1-W) \cdot V_P \quad (3)$$

Figure 16:
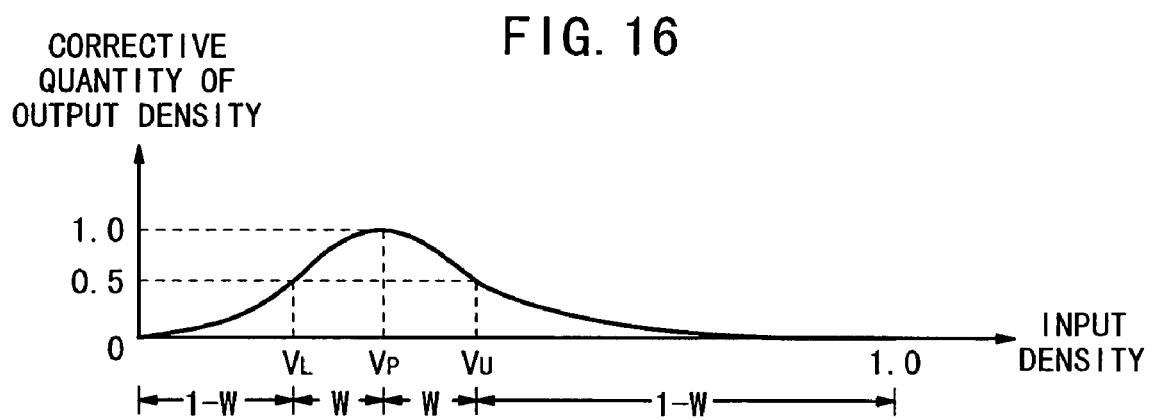
FIG. 16 is a diagram illustrating a gradation corrective function for correcting gradation correction characteristics with respect to the density of an attentional portion.

Using the parameters thus set or determined, the gradation corrective function $\gamma_d$ is set as a function passing through five points (0, 0), ($V_L$, $I_L$), ($V_P$, 1), ($V_U$, $I_U$), (1, 0). The function can be obtained by way of approximation using a function of multi-order or quasi-Hermite interpolation. FIG. 16 shows a gradation corrective function $\gamma_d$ when $I_L = I_U = 0.5$. The peak density $V_P$ may be set to a desired value by the operator, instead of being set to the value $P_Y$ of the density data Y of the attentional portion.

The operator estimates the shape of the gradation corrective function $\gamma_d$ thus set. If the shape of the gradation corrective function $\gamma_d$ is acceptable, then the operator selects the button "REGISTER" to register the gradation corrective function $\gamma_d$. Alternatively, the operator may correct a gradation corrective function $\gamma_d$ by selecting the button "READ" to read a peak density $V_P$, a density width W, and intensities $I_L$, $I_U$ and correcting these parameters. In this case, it is possible to dispense with the process of specifying an attentional portion with the mouse 26. The operator may establish a title of the gradation corrective function $\gamma_d$ at the time of registration thereof. Then, it will be possible to read and display the titles of registered gradation corrective functions $\gamma_d$ for selecting a desired one of the displayed titles. Accordingly, respective parameters corresponding to the desired gradation corrective function may be read and used.

If the item "GRADATION CORRECTION (L)" is selected, then a peak density $V_P$ may be determined, using values $P_C$, $P_M$, $P_Y$ of the density data C, M, Y of the attentional portion, as follows:

$$V_P = 0.3 P_C + 0.59 P_M + 0.11 P_Y \quad (4)$$

and a gradation corrective function $\gamma_d$ may then be determined in the same manner as described above.

If a plurality of spots are specified as an attentional portion, then the densities at the specified spots are averaged, and the average value is used as a peak density $V_P$. A standard deviation $\sigma$ is determined from the densities and the average value, and parameters $W_{min}$, $W_{max}$ related to each other such that $0 < W_{min} \leq W \leq W_{max} < 1$ are set. A density width W is determined by the following equation (5):

$$W = 3(W_{max} - W_{min}) \cdot \sigma / V_P + W_{min} \quad (5)$$

and a gradation corrective function $\gamma_d$ may then be determined in the same manner as described above. The parameters $W_{min}$, $W_{max}$ are set for limiting a practical range of density, for example, $W_{min} = 0.25$ and $W_{mad} = 0.75$. Alternatively, the parameters $W_{min}$, $W_{max}$ can be stored as arbitrary ones in a system. If $W > W_{max}$, then the value W is set to be $W_{max}$.

If an area is specified as an attentional portion, then a gradation corrective function $\gamma_d$ may be set based on the average value of densities of all images contained in the area.

Figure 13:
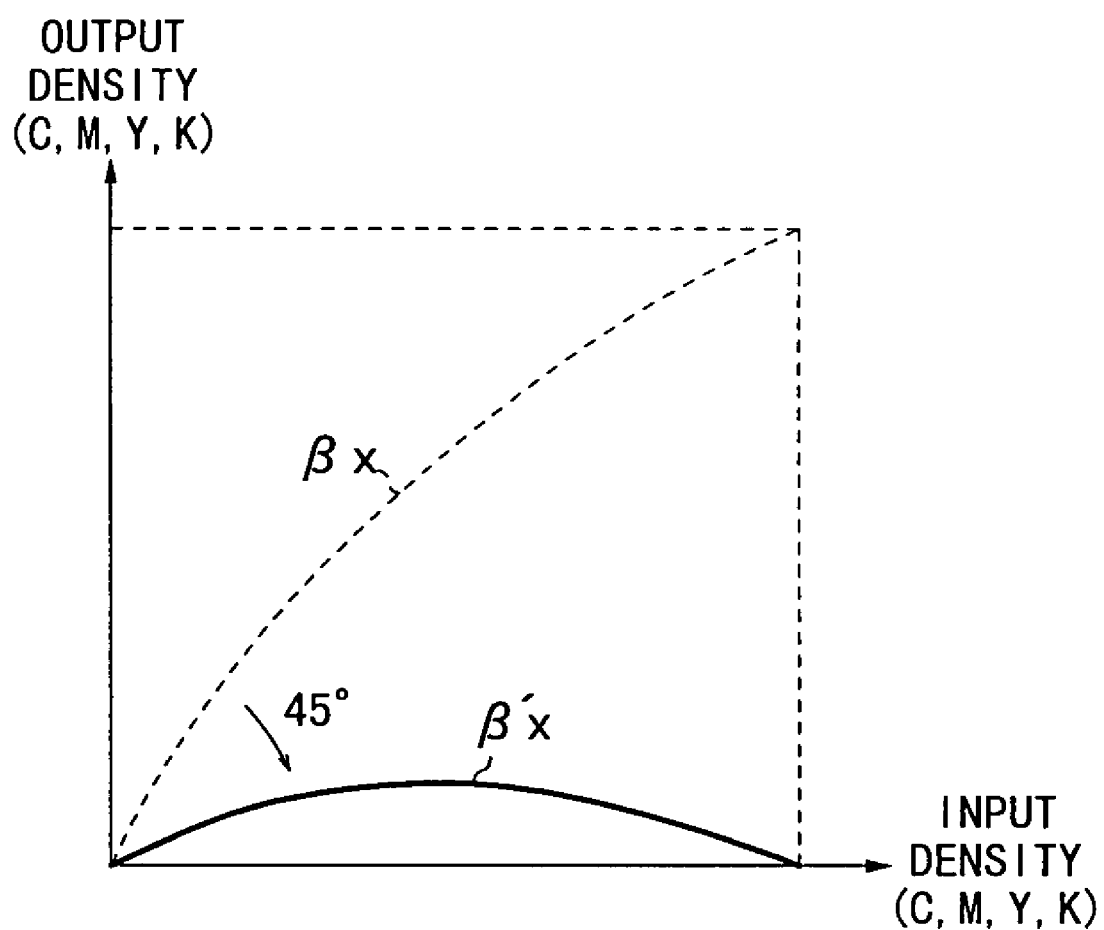
FIG. 13 is a diagram illustrating the adjustment of gradation conversion characteristics.
Figure 14:
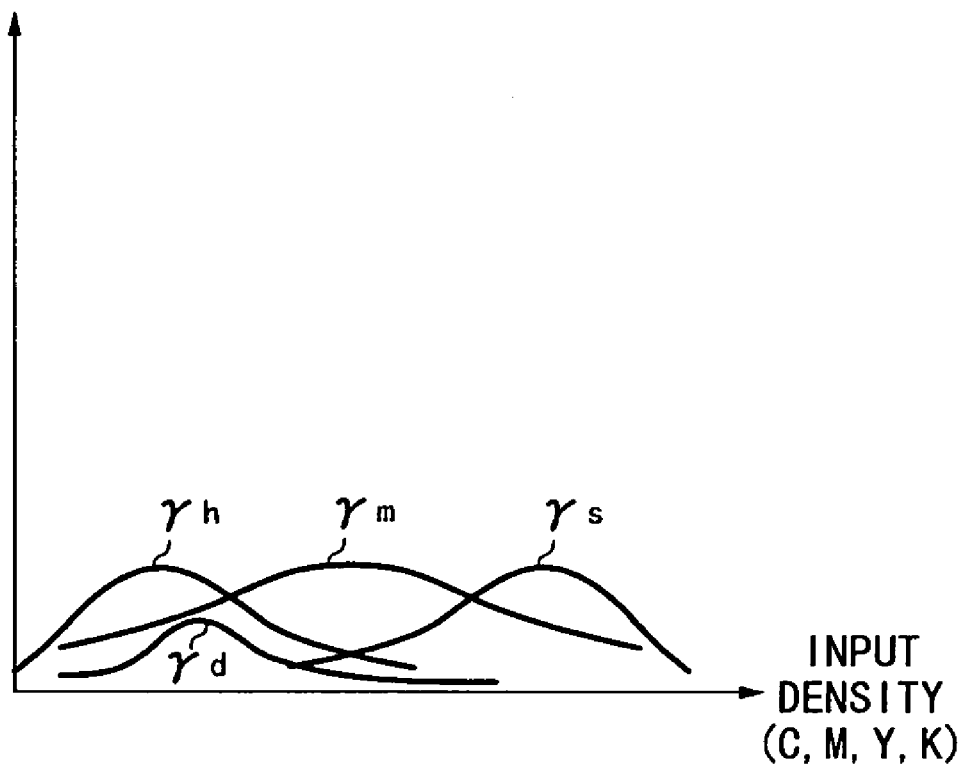
FIG. 14 is a diagram illustrating the adjustment of gradation conversion characteristics.

Based on the equation (1), the tone curve $\beta_X''$ thus generated is expanded by $1/\sqrt{2}$ in both the directions of input and output densities, and then turned 45° counterclockwise in FIG. 13, thus generating new tone curves $\beta_{XN}$ capable of achieving a desired gradation conversion. Of the new tone curves $\beta_{XN}$, tone curves $\beta_{CN}$, $\beta_{MN}$, $\beta_{YN}$ are set in the gradation converting circuit 36, and a tone curve $\beta_{KN}$ is set in the K generating circuit 39.

The density data C, M, Y supplied to the gradation converting circuit 36 are converted in gradation according to the respective tone curves $\beta_{CN}$, $\beta_{MN}$, $\beta_{YN}$, and then supplied to the adder 42. In this case, the operator can obtain density data C, M, Y converted in gradation at the desired density specified by the operator.

The UCR circuit 38 calculates corrective quantities $\Delta C$, $\Delta M$, $\Delta Y$ for the density data C, M, Y from the maximum and minimum values of the density data C, M, Y selected by the signal selecting circuit 37 and the UCR intensity set by the operator, and supplies the calculated corrective quantities $\Delta C$, $\Delta M$, $\Delta Y$ as negative data to the adder 42. The density data C, M, Y which have been converted in gradation by the gradation converting circuit 36 are corrected with the corrective quantities $\Delta C$, $\Delta M$, $\Delta Y$ by the adder 42, which supplies the corrected density data C, M, Y to the adder 66.

The K generating circuit 39 generates density data K with respect to the minimum values of the density data C, M, Y selected by the signal selecting circuit 37, and converts the density data K in gradation according to the tone curve $\beta_{KN}$. The gradation-converted density data K is supplied to the adder 66.

The density data C, M, Y, K thus supplied to the adder 66 are corrected according to corrective quantities $\Delta C$, $\Delta M$, $\Delta Y$, $\Delta K$ which are calculated by the color correcting circuit 40. The corrected density data C, M, Y, K are supplied to the halftone dot % converting circuit 68.

A process of calculating the corrective quantities $\Delta C$, $\Delta M$, $\Delta Y$, $\Delta K$, which is carried out by the color correcting circuit 40, will be described in detail below.

The range-adjusted density data C, M, Y from the range adjusting circuit 34 are supplied to the color correcting circuit 40, in which the range-adjusted density data C, M, Y are converted into a hue H, a lightness L, and a saturation S by the HLS converting circuit 44.

The hue H is in the range of $0 \leq H < 6$, the lightness L in the range of $0 \leq L < 1$, and the saturation S in the range of $0 \leq S < 1$. The hue H=0 represents the color R, the hue H=1 the color Y, the hue H=2 the color G, the hue H=3 the color C, the hue H=4 the color B, and the hue H=5 the color M (see FIG. 9). The lightness L=0 represents a dark color, and the lightness L=1 a light color. The saturation S=0 represents a dull color, and the saturation S=1 a vivid color.

The HLS converting circuit 44 determines a maximum value $Q_{max}$, a middle valve $Q_{mid}$, and a minimum value $Q_{min}$ of the density data C, M, Y. It is assumed that the density data C, M, Y which give the maximum value $Q_{max}$ are denoted by $P_{max}$, the density data C, M, Y which give the middle value $Q_{mid}$ by $P_{mid}$, and the density data C, M, Y which give the minimum value $Q_{min}$ by $P_{min}$, and that $$V = (Q_{mid} - Q_{min}) / (Q_{max} - Q_{min}) \quad (6)$$

When $P_{max}=Y$ and $P_{min}=C$, the hue H is determined by:

$$H=1-V \quad (7)$$

When $P_{max}=Y$ and $P_{min}=M$, the hue H is determined by:

$$H=1+V \quad (8)$$

When $P_{max}=C$ and $P_{min}=M$, the hue H is determined by:

$$H=3-V \quad (9)$$

When $P_{max}=C$ and $P_{min}=Y$, the hue H is determined by:

$$H=3+V \quad (10)$$

When $P_{max}=M$ and $P_{min}=Y$, the hue H is determined by:

$$H=5-V \quad (11)$$

When $P_{max}=M$ and $P_{min}=C$, the hue H is determined by:

$$H=5+V \quad (12)$$

The HLS converting circuit 44 determines a lightness L as follows:

$$L=1-Q_{max} \quad (13)$$

If $Q_{max} \leq 0$, then the saturation S is determined as:

$$S=0 \quad (14)$$

Otherwise, the saturation S is determined as:

$$S=1-(Q_{min}+0.1)/(Q_{max}+0.1) \quad (15)$$

The hue H, the lightness L, and the saturation S thus determined are supplied to the C corrective quantity calculating circuit 46, the M corrective quantity calculating circuit 48, the Y corrective quantity calculating circuit 50, and the K corrective quantity calculating circuit 52, which calculate respective corrective quantities ΔC, ΔM, ΔY, ΔK.

Figure 17:
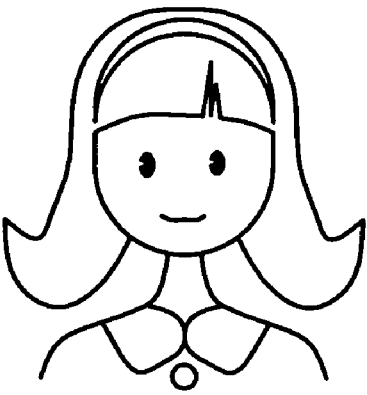
FIG. 17 is a view showing a displayed color correcting view.

At this time, the display unit 22 of the image processing device 20 displays a color correcting view as well as the read color image, as shown in FIG. 17. The operator performs a color correction procedure according to the displayed color correcting view.

When the operator enters a color correction number, existing color corrective functions preset with respect to the density data C, M, Y, K are selected and existing color corrective coefficients $a_{Xv}$ are called to calculate respective corrective quantities ΔC, ΔM, ΔY, ΔK. With X of $a_{Xv}$ representing C, M, Y, K and v of $a_{Xv}$ representing c, m, y, r, g, b, d, the color corrective coefficients $a_{Xv}$ serve as color corrective coefficients for the six hues C, M, Y, R, G, B for the plates in C, M, Y, K and the hue of the attentional portion (Def).

A process of calculating the corrective quantity ΔC will be described below with reference to FIG. 8. The hue H produced by the HLS converting circuit 44 is supplied to the hue direction corrective intensity calculating circuit 58, which determines a hue corrective intensity vh according to a preset hue direction corrective intensity function $F_c(H)$ primarily for the hue C that is established as shown in FIG. 9. The lightness L and the saturation S are supplied to the lightness/saturation direction corrective intensity calculating circuit 60, which calculates a lightness/saturation corrective intensity va according to a preset lightness/saturation direction corrective intensity function $G_c(L,S)$. The hue corrective intensity vh and the lightness/saturation corrective intensity va are multiplied with the multiplier 62, which outputs a corrective intensity vr that is multiplied by a color corrective coefficient $a_{Cc}$ with the multiplier 64, which outputs a color corrective intensity uc. The color corrective intensity uc is thus determined as follows:

$$uc=F_c(H) \cdot G_c(L,S) \cdot a_{Cc} \quad (16)$$

Similarly, the unit color corrective quantity calculating circuits 54M, 54Y, 54R, 54G, 54B, 54D determine respective unit color corrective intensities um, uy, ur, ug, ub, ud with respect to unit hues corresponding to M, Y, R, G, B and a unit hue D specified by the attentional portion (Def), using a hue direction corrective intensity function $F_v(H)$ and a lightness/saturation direction corrective intensity function $G_v(L,S)$ according to the equations (17) through (22) shown below. With v of $F_v(H)$, $G_v(L,S)$ representing c, m, y, r, g, b, d, the hue direction corrective intensity function $F_v(H)$ and the lightness/saturation direction corrective intensity function $G_v(L,S)$ serve as direction corrective intensity functions for the six hues C, M, Y, R, G, B and the hue of the attentional portion (Def).

$$um=F_m(H) \cdot G_m(L,S) \cdot a_{Cm} \quad (17)$$

$$uy=F_y(H) \cdot G_y(L,S) \cdot a_{Cy} \quad (18)$$

$$ur=F_r(H) \cdot G_r(L,S) \cdot a_{Cr} \quad (19)$$

$$ug=F_g(H) \cdot G_g(L,S) \cdot a_{Cg} \quad (20)$$

$$ub=F_b(H) \cdot G_b(L,S) \cdot a_{Cb} \quad (21)$$

$$ud=F_d(H) \cdot G_d(L,S) \cdot a_{Cd} \quad (22)$$

The unit color corrective quantities uc, um, uy, ur, ug, ub, ud thus determined are added to each other by the adder 56, which outputs a corrective quantity ΔC with respect to the density data C.

Figure 18:
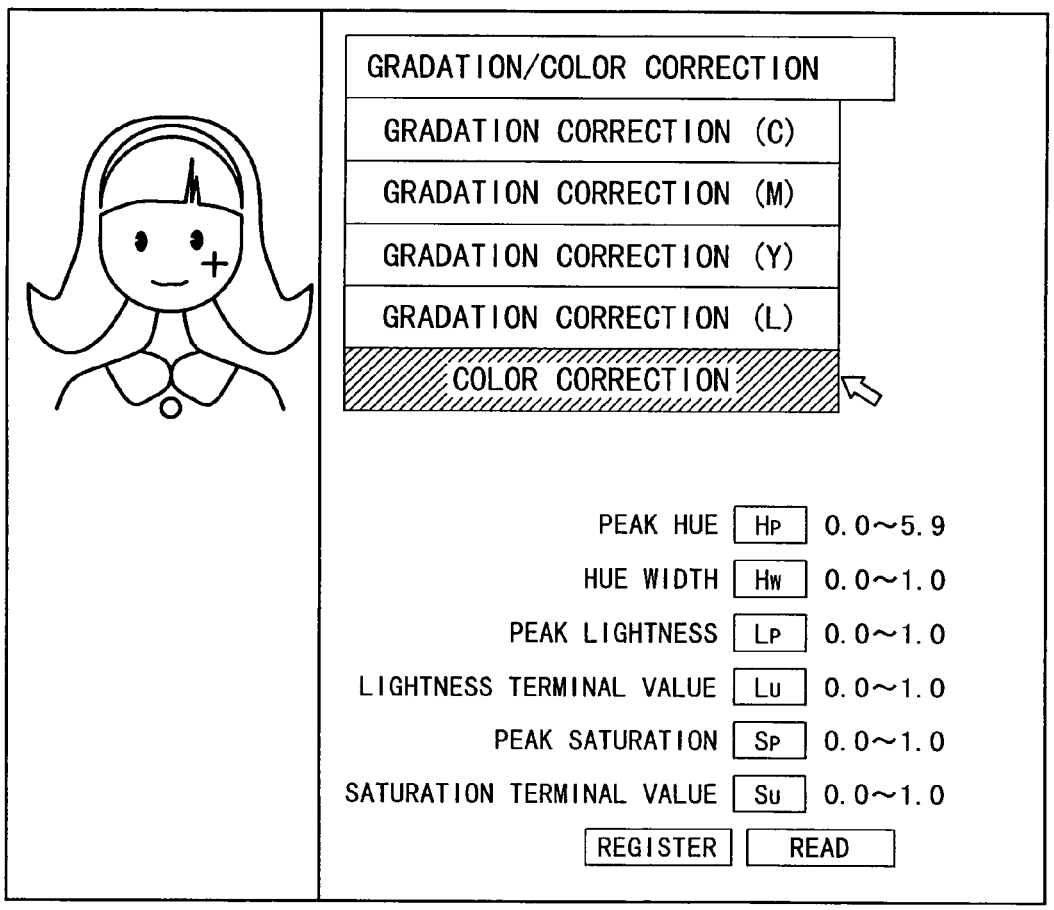
FIG. 18 is a view showing a displayed view for adjusting color correction with respect to a hue, a lightness, and a saturation of an attentional portion.

A hue direction corrective intensity function $F_d(H)$ and a lightness/saturation direction corrective intensity function $G_d(L,S)$ for the hue D of the attentional portion can be established as follows:

When the operator selects the button "CHANGE" in the button "CHANGE" in the color correcting view shown in FIG. 17, the display unit 22 displays a corrective intensity function setting view shown in FIG. 18. In the displayed corrective intensity function setting view, the operator uses the mouse 26 to specify an attentional portion, i.e., a spot where "+" is displayed on the image. At this time, the operator may specify a plurality of spots as the attentional portion. Alternatively, the operator may specify an area surrounded by a line. Then, the operator selects the button "GRADATION/COLOR CORRECTION", whereupon the display unit 22 displays a menu including "GRADATION CORRECTION (C)", "GRADATION CORRECTION (M)", "GRADATION CORRECTION (Y)", "GRADATION CORRECTION (L)", and "COLOR CORRECTION". The operator selects "COLOR CORRECTION" from the displayed menu.

Figure 19:
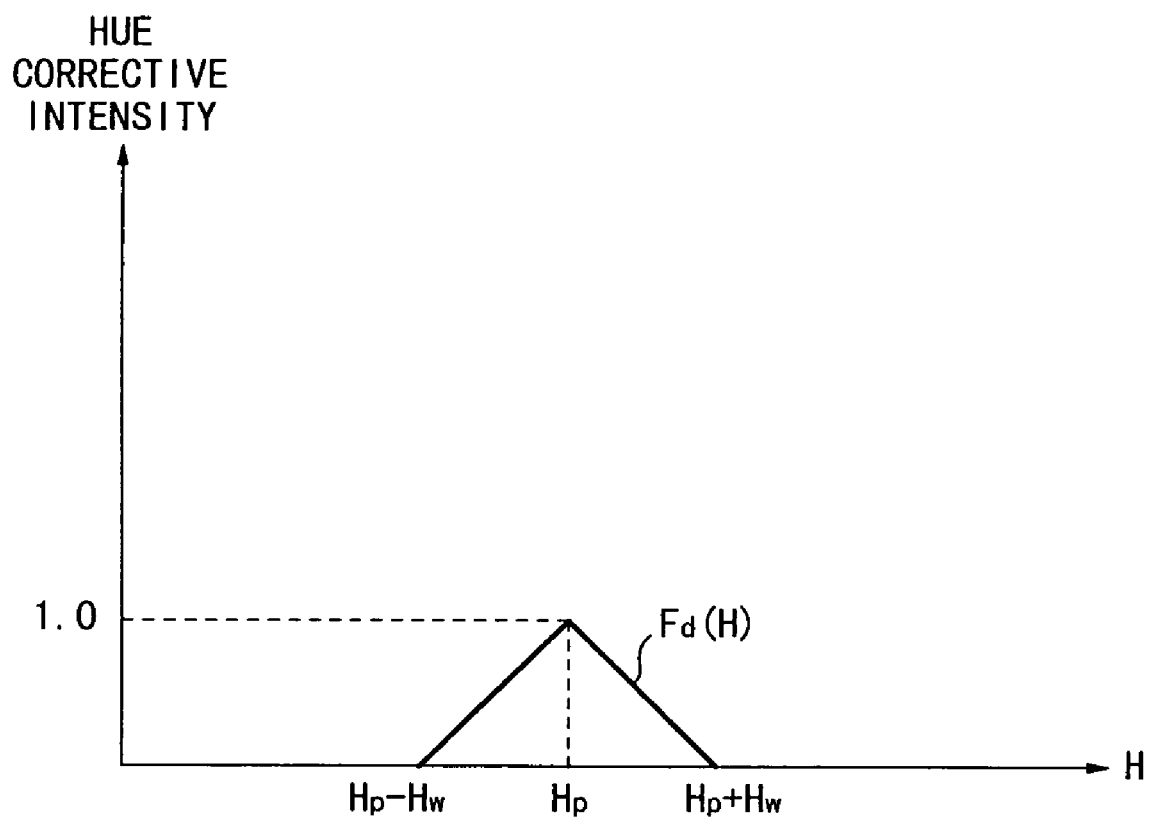
FIG. 19 is a diagram illustrating a hue direction corrective intensity function with respect to an attentional portion.

The HLS converting circuit 44 determines a hue H, a lightness L, and a saturation S of the attentional portion that the operator has specified with the mouse 26. Using the value $H_C$ of the obtained hue H as a peak hue $H_P$, and the hue width $H_W$ (0<$H_W$<1) thereof as a parameter, the image processing device 20 establishes a hue direction corrective intensity function $F_d(H)$ by linearly interpolating three points ($H_P-H_W$, 0), ($H_P$, 1), ($H_P+H_W$, 0) within the interval thereof, as shown in FIG. 19. The hue direction corrective intensity function $F_d(H)$ is a function that is cyclically defined in the range of 0<H<6 as with the other hue direction corrective intensity functions shown in FIG. 9. If $H_P-H_W<0$ or $H_P+H_W>6$, then the hue direction corrective intensity function $F_d(H)$ is established in the cyclic range as with the hue direction corrective intensity function $F_r(H)$.

Figure 20:
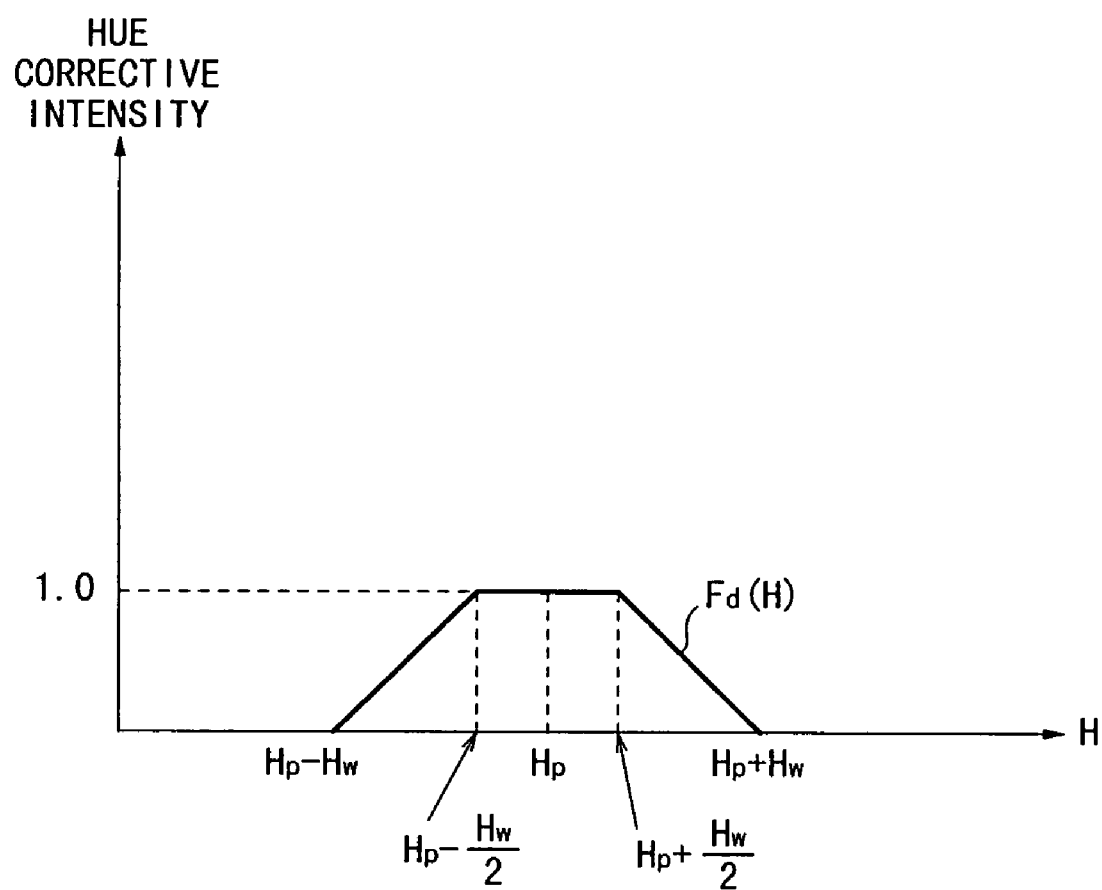
FIG. 20 is a diagram illustrating a hue direction corrective intensity function with respect to an attentional portion according to another embodiment of the present invention.

As shown in FIG. 20, the hue direction corrective intensity function $F_d(H)$ may be established by linearly interpolating four points $(H_P-H_W, 0)$, $(H_P-H_W/2, 1)$, $(H_P+H_W/2, 1)$, $(H_P+H_W, 0)$ within the interval thereof, as shown in FIG. 20.

Figure 21:
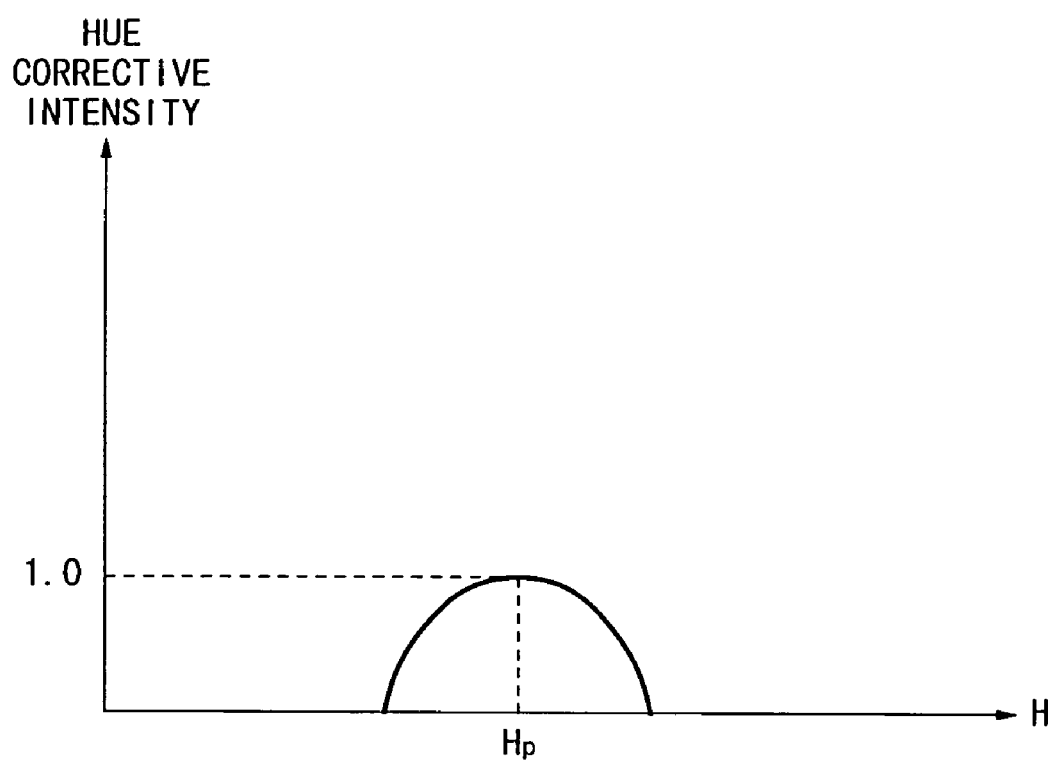
FIG. 21 is a diagram illustrating a hue direction corrective intensity function with respect to an attentional portion according to still another embodiment of the present invention.

Alternatively, as shown in FIG. 21, using a shape coefficient A, the hue direction corrective intensity function $F_d(H)$ may be established as follows:

$$F_d(H)=A\cdot(H-H_P)^2+1 \quad (23)$$

Figure 22:
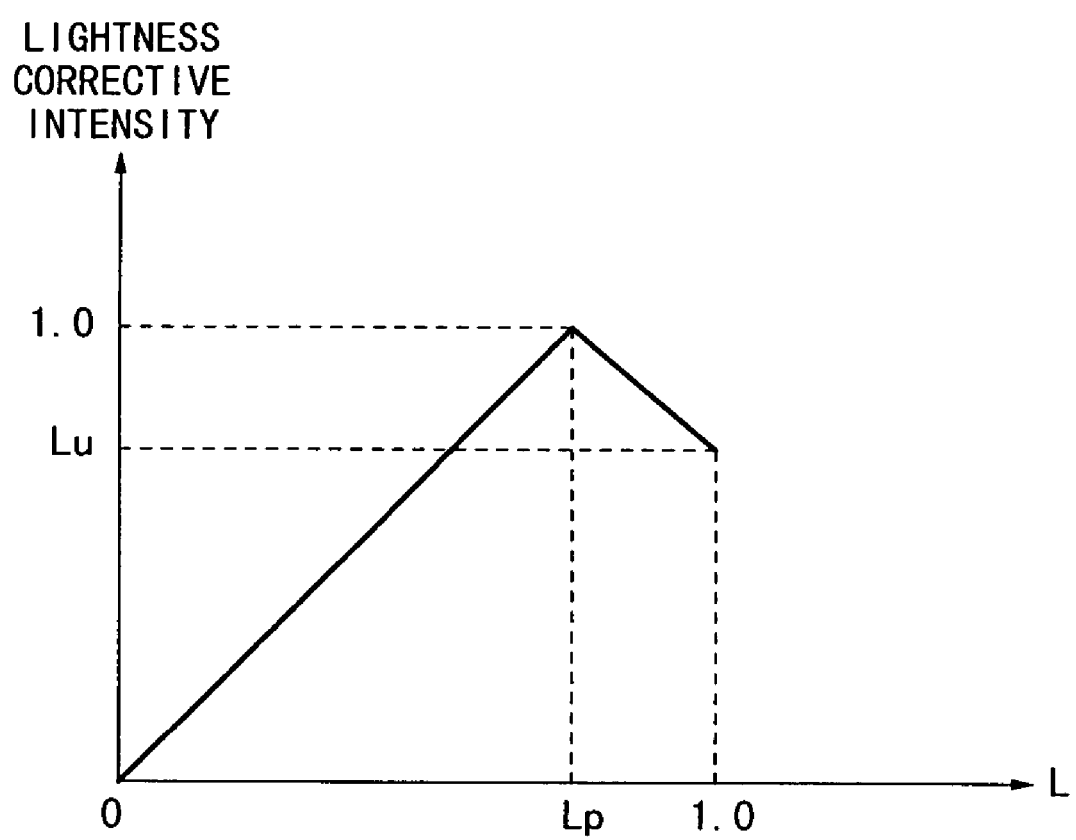
FIG. 22 is a diagram illustrating a lightness direction corrective intensity function with respect to an attentional portion.

Using the value $L_C$ of the lightness L of the specified attentional portion (Def) as a peak lightness $L_P$, and a lightness terminal value $L_u$, expressed as:

$$L_u=1-L_C \quad (24)$$

the image processing device 20 establishes a lightness direction corrective intensity function $g1_d(L)$ by linearly interpolating three points $(0, 0)$, $(L_P, 1)$, $(1, L_u)$ within the interval thereof, as shown in FIG. 22.

Figure 23:
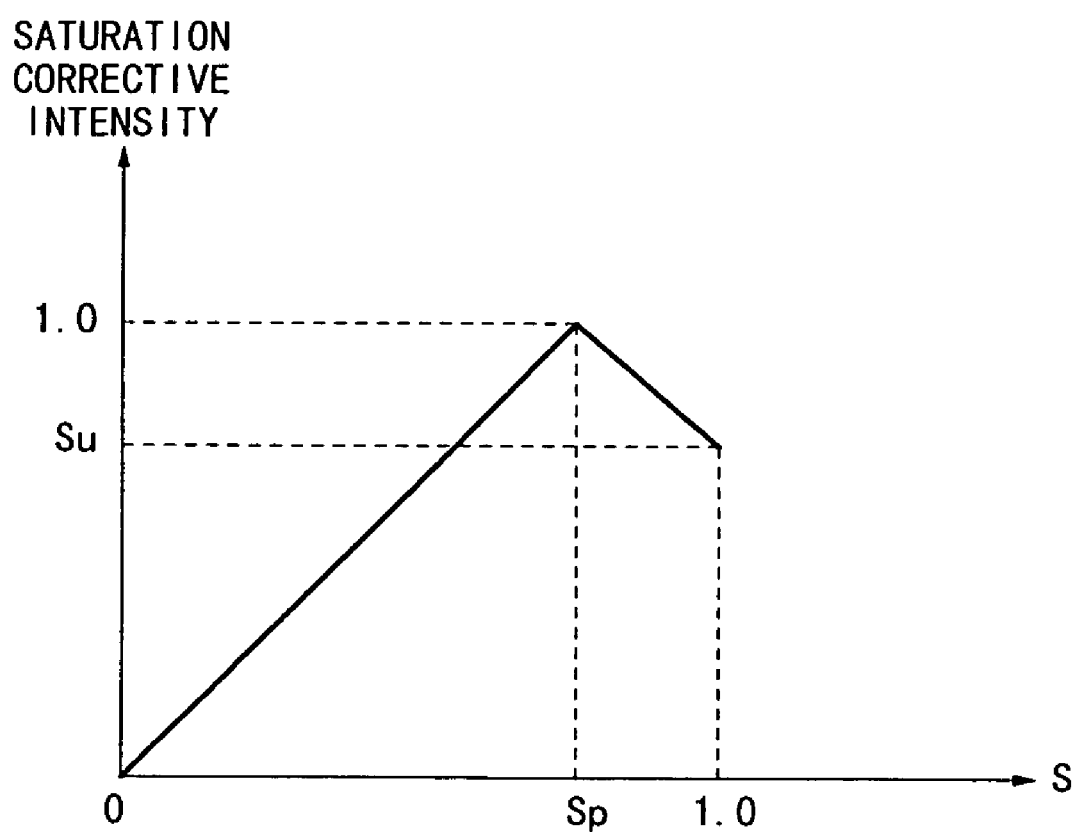
FIG. 23 is a diagram illustrating a saturation direction corrective intensity function with respect to an attentional portion.

Using the value $S_C$ of the saturation S of the specified attentional portion (Def) as a peak saturation $S_P$, and a saturation terminal value $S_u$ expressed as:

$$S_u=1-S_C \quad (25)$$

the image processing device 20 establishes a saturation direction corrective intensity function $g2_d(L)$ by linearly interpolating three points $(0, 0)$, $(S_P, 1)$, $(1, S_u)$ within the interval thereof, as shown in FIG. 23.

A lightness/saturation direction corrective intensity function $G_d(L,S)$ is established from the lightness direction corrective intensity function $g1_d(L)$ and the saturation direction corrective intensity function $g2_d(L)$, as follows:

$$G_d(L,S)=g1_d(L)\cdot g2_d(L) \quad (26)$$

The peak hue $H_P$, the hue width $H_W$, the peak lightness $L_P$, the lightness terminal value $L_u$, the peak saturation $S_P$, and the saturation terminal value $S_u$ of the hue direction corrective intensity function $F_d(H)$ and the lightness/saturation direction corrective intensity function $G_d(L,S)$ which are thus established are displayed as shown in FIG. 18. Based on the established values, the operator estimates the shapes of the hue direction corrective intensity function $F_d(H)$ and the lightness/saturation direction corrective intensity function $G_d(L,S)$. If the shapes of the hue direction corrective intensity function $F_d(H)$ and the lightness/saturation direction corrective intensity function $G_d(L,S)$ are acceptable, then the operator selects the button "REGISTER" to register the hue direction corrective intensity function $F_d(H)$ and the lightness/saturation direction corrective intensity function $G_d(L,S)$. At this time, the operator may establish titles of the registered functions. Alternatively, the operator may correct a hue direction corrective intensity function $F_d(H)$ and a lightness/saturation direction corrective intensity function $G_d(L,S)$ by selecting the button "READ" to display registered titles, selecting a desired one of the displayed titles to read parameters, and correcting the parameters. In this case, it is possible to dispense with the process of specifying an attentional portion with the mouse 26.

If a plurality of spots are specified or an area is specified as an attentional portion, then the following process is carried out:

The hue H is of a value that cycles in the range from 0 to 6 where 0 and 6 represent the same hue. Maximum and minimum values of the hue H of an image represented by a plurality of spots or an area, and the difference between the maximum and minimum values is indicated by $H_A$. The hue H which has a value of 3 or more is replaced with H-6, and maximum and minimum values of the replaced hue H' are determined, with the difference therebetween being indicated by $H_B$. These differences $H_A$, $H_B$ are compared with each other. The maximum and minimum values of the hue which gives the smaller difference are indicated respectively by $H_{max}$ and $H_{min}$. Then, an average value of the hue H or H' is determined. If the average value is negative, then 6 is added to the average value. The average value of the hue H thus determined is indicated by $H_P$. From the maximum and minimum values $H_{max}$, $H_{min}$, the difference is determined as follows:

$$H_{dif}=H_{max}-H_{min} \quad (27)$$

If $H_{dif}>2$, then it is determined that a plurality of hues H of the attentional portion are excessively spaced apart, and the process is interrupted. If $H_{dif}\leq 2$, then the hue width $H_W$ is calculated as follows:

$$H_W=0.5\cdot H_{dif}+0.5 \quad (28)$$

If $H_W>1$, then $H_W$ is set to $H_W=1$, and a hue direction corrective intensity function $F_d(H)$ is determined as described above.

With respect to the lightness L, an average value of the lightness L is used as a peak lightness $L_P$, and a maximum value of the lightness L is indicated by $L_{max}$. A lightness terminal value $L_u$ is determined as:

$$L_u=(L_{max}-1)\cdot L_P/(1-L_P)+1 \quad (29)$$

and a lightness direction corrective intensity function $g1_d(L)$ is determined as described above.

With respect to the saturation S, an average value of the saturation S is used as a peak saturation $S_P$, and a maximum value of the saturation S is indicated by $S_{max}$. A saturation terminal value $S_u$ is determined as:

$$S_u=(S_{max}-1)\cdot S_P/(1-S_P)+1 \quad (30)$$

and a saturation direction corrective intensity function $g2_d(S)$ is determined as described above.

The color correcting circuit 40 calculates corrective quantities $\Delta C$, $\Delta M$, $\Delta Y$, $\Delta K$ for the respective density data C, M, Y, K. The corrective quantities $\Delta C$, $\Delta M$, $\Delta Y$, $\Delta K$ have been corrected as desired for the color of the attentional portion which the operator has specified.

The corrective quantities $\Delta C$, $\Delta M$, $\Delta Y$, $\Delta K$ are added to the gradation-converted density data C, M, Y, K by the adder 66, and then supplied to the halftone dot % converting circuit 68. The halftone dot % converting circuit 68 converts the corrected density data C, M, Y, K into halftone dot % data, which are outputted to the output device 30. The output device 30 produces film plates or printing plates of C, M, Y, K from the supplied halftone dot % data.

Although certain preferred embodiments of the present invention have been shown and described in detail, it should be understood that various changes and modifications may be made therein without departing from the scope of the appended claims.

In the above description, only one set of the gradation corrective function $\gamma_d$, the hue direction corrective intensity function $F_d(H)$, and the lightness/saturation direction corrective intensity function $G_d(L,S)$ is defined. However, the present invention is not necessarily limited to such embodiments. Alternatively, a set of functions may be set for each one of a plurality of attentional portions having different colors, and gradation conversion and color correction can be performed for those portions, such as an portion having a flesh color and an portion having a color of sky blue. Specifically, a plurality of gradation corrective coefficient setting items (e.g., assumed to appear as buttons named "Def1," "Def2," . . . ) are prepared in the tone curve setting view shown in FIG. 12. The operator selects the button "CHANGE" in the tone curve setting view for determining and registering the gradation corrective function $\gamma_d$ with respect to each of the attentional portions. After that, the respective registered gradation corrective functions $\gamma_d$ are added to the equation (1), so that each of the gradation corrective functions $\gamma_d$ can be independently effective thereon. In the same manner, a plurality of displayed color corrective coefficient setting items (e.g., assumed to appear as buttons named "Def1," "Def2," . . . ) are prepared in the displayed color correcting view shown in FIG. 17. The operator selects the button "CHANGE" in the displayed color correcting view for determining and registering the hue direction corrective intensity function $F_d(H)$ and the lightness/saturation direction corrective intensity function $G_d(L,S)$ with respect to each of the attentional portions. After that, the respective registered hue direction corrective intensity functions $F_d(H)$ and lightness/saturation direction corrective intensity functions $G_d(L,S)$ are added to the adder 56 shown in FIG. 8, so that each of the hue direction corrective intensity functions $F_d(H)$ and lightness/saturation direction corrective intensity functions $G_d(L,S)$ can be independently effective thereon.

What is claimed is:

1. A method of processing an image by way of gradation conversion, comprising the steps of:

specifying plural attentional portions on a displayed image;

generating a first gradation corrective function with respect to density values of the plural specified attentional portions;

correcting a preset gradation conversion characteristic with the first gradation corrective function; and converting the gradation of said image according to the corrected gradation conversion characteristic, wherein the first gradation corrective function which corrects a predetermined area of the preset gradation conversion characteristic is generated based the displayed image, wherein the attentional portions are specified by setting a designation mark on the displayed image, and a second gradation corrective function which corrects the gradation conversion characteristic with respect to gradations of the attentional portions is generated, and the gradation conversion characteristic is corrected based on the first and second gradation corrective functions.

2. A method according to claim 1, further comprising the step of:

saving at least one of said first and second gradation corrective function, so that the saved gradation corrective function can be read and used.

3. A method according to claim 2, wherein the read gradation corrective function can be corrected.

4. The method of claim 1, wherein the plural attentional portions comprise a subset of data which is less than a frame of an image.

5. The method of claim 4, wherein the plural attentional portions are discontinuous from each other.

6. The method of claim 4, wherein the frame includes attentional portions and non-attentional portions, and wherein the non-attentional portions are not used when generating the common gradation corrective function and obtaining the preset gradation conversion characteristic.

7. The method of claim 6 wherein the plural attentional portions comprise discontinuously located spots.

8. A method of processing an image by way of gradation conversion, comprising the steps of:

specifying an attentional portion of an image, said attentional portion including a combination of plural color signals;

generating a first gradation corrective function with respect to density values of the plural color signals of the specified attentional portion;

correcting a preset gradation conversion characteristic with said first gradation corrective function; and converting the gradation of said image according to the corrected gradation conversion characteristic, wherein the first gradation corrective function which corrects a predetermined area of the preset gradation conversion characteristic is generated based the displayed image, wherein the attentional portion is specified by setting a designation mark on the displayed image, and a second gradation corrective function which corrects the gradation conversion characteristic with respect to gradation of the attentional portion is generated, and the gradation conversion characteristic is corrected based on the first and second gradation corrective functions.

9. A method of processing a color image by way of color correction, comprising the steps of:

specifying plural attentional portions of the color image;

generating a first color corrective function with respect to density values of color signals of the plural specified attentional portions; and correcting said color with said first color corrective function, wherein the first color corrective function which corrects color of a predetermined area is generated based the displayed image, wherein the attentional portions are specified by setting a designation mark on the displayed image, and a second color corrective function which corrects the color of the attentional portions is generated, and the color is corrected based on the first and second color corrective functions.

* * * * *